United States Patent
Sun

(10) Patent No.: US 11,886,041 B2
(45) Date of Patent: Jan. 30, 2024

(54) CAMERA OPTICAL LENS

(71) Applicant: Changzhou Raytech Optronics Co., Ltd., Changzhou (CN)

(72) Inventor: Wen Sun, Shenzhen (CN)

(73) Assignee: CHANGZHOU RAYTECH OPTRONICS CO., LTD., Changzhou (CN)

( * ) Notice: Subject to any disclaimer, the term of this patent is extended or adjusted under 35 U.S.C. 154(b) by 471 days.

(21) Appl. No.: 17/133,678

(22) Filed: Dec. 24, 2020

(65) Prior Publication Data

US 2022/0026671 A1    Jan. 27, 2022

(30) Foreign Application Priority Data

Jul. 27, 2020 (CN) .......................... 202010727558.5

(51) Int. Cl.
*G02B 9/64* (2006.01)
*G02B 13/18* (2006.01)

(52) U.S. Cl.
CPC .............. *G02B 9/64* (2013.01); *G02B 13/18* (2013.01)

(58) Field of Classification Search
CPC ...... G02B 9/64; G02B 13/18; G02B 13/0045; G02B 13/04; G02B 13/06
USPC ........................................................ 359/708
See application file for complete search history.

(56) References Cited

U.S. PATENT DOCUMENTS

2021/0396974 A1* 12/2021 Kuo ................... G02B 13/0045

FOREIGN PATENT DOCUMENTS

| CN | 110609376 A | * | 12/2019 | ......... G02B 13/0015 |
| TW | 1769289 B | * | 1/2022 | |

OTHER PUBLICATIONS

Duerr, Meuret, and Thienpont, Potential Benefits of Free-Form Optics in On-Axis Imaging Applications with High Aspect Ratio, Optics Express, V.21, 31072 (2013) (Year: 2013).*

* cited by examiner

*Primary Examiner* — Mohammed A Hasan
(74) *Attorney, Agent, or Firm* — W&G Law Group

(57) ABSTRACT

The present disclosure relates to the field of optical lenses, and discloses a camera optical lens. The camera optical lens includes eight lenses, and the eight lenses includes successively from an object side to an image side: a first lens having negative refractive power, a second lens having positive refractive power, a third lens, a fourth lens, a fifth lens, a sixth lens, a seventh lens, and an eighth lens. An object side surface of the eighth lens is a convex surface at a paraxial position, an image side surface thereof is a concave surface at a paraxial position, and at least one of the first lens to the eighth lens includes a free-form surface. The camera optical lens of the present disclosure has good optical performance while meeting design requirements of a large aperture, ultra-thinness, and a wide angle while.

9 Claims, 12 Drawing Sheets

CAMERA OPTICAL LENS

TECHNICAL FIELD

The present disclosure relates to the field of optical lenses, and in particular, to a camera optical lens applicable to portable terminal devices such as smart phones and digital cameras, as well as camera devices such as monitors and PC lenses.

BACKGROUND

With the development of imaging lenses, people have increasingly higher requirements on the imaging of lenses, and "night vision" and "background blur" of the lenses have also become important indicators to measure imaging standards of the lenses. Existing structures are insufficient in refractive power distribution, lens spacing, and lens shape setting, resulting in insufficient lens ultra-thinness and wide angle. Moreover, aspheric surfaces with rotational symmetry do not correct aberration well. A free-form surface is a surface type of non-rotational symmetry, and can better balance aberration and improve imaging quality. Moreover, free-form surface machining is also gradually mature. With the improvement of requirements on lens imaging, it is very important to add a free-form surface to lens design, which particularly has a more obvious effect in wide-angle and ultra-wide-angle lens design.

SUMMARY

In view of the above problems, an objective of the present disclosure is to provide a camera optical lens that has good optical performance while having a large aperture, ultra-thinness, and a wide angle.

The technical solution of the present disclosure is as follows.

A camera optical lens, includes from an object side to an image side: a first lens having negative refractive power, a second lens having positive refractive power, a third lens, a fourth lens, a fifth lens, a sixth lens, a seventh lens, and an eighth lens; wherein an object side surface of the eighth lens is a convex surface at a paraxial position, an image side surface of the eighth lens is a concave surface at a paraxial position, and at least one of the first lens, the second lens, the third lens, the fourth lens, the fifth lens, the sixth lens, the seventh lens and the eighth lens includes a free-form surface.

As an improvement, the camera optical lens satisfies: $0.30 \leq d8/d9 \leq 1.00$, where an on-axis distance from an image side surface of the fourth lens to an object side surface of the fifth lens is d8, and an on-axis thickness of the fifth lens is d9.

As an improvement, the camera optical lens satisfies:

$-4.53 \leq f1/f \leq -1.30$;

$-2.30 \leq (R1+R2)/(R1-R2) \leq -0.31$; and $0.04 \leq d1/TTL \leq 0.14$, where f denotes a total focal length of the camera optical lens, f1 denotes a focal length of the first lens, R1 denotes a central curvature radius of an object side surface of the first lens, R2 denotes a central curvature radius of an image side surface of the first lens, d1 denotes an on-axis thickness of the first lens, and TTL denotes a total optical length from an object side surface of the first lens to an image plane of the camera optical lens along an optic axis.

As an improvement, the camera optical lens satisfies:

$2.10 \leq f2/f \leq 11.74$;

$-14.09 \leq (R3+R4)/(R3-R4) \leq -2.21$; and $0.02 \leq d3/TTL \leq 0.10$, where f denotes the total focal length of the camera optical lens, f2 denotes a focal length of the second lens, R3 denotes a central curvature radius of an object side surface of the second lens, R4 denotes a central curvature radius of an image side surface of the second lens is, d3 denotes an on-axis thickness of the second lens, and TTL denotes a total optical length from an object side surface of the first lens to an image plane of the camera optical lens along an optic axis.

As an improvement, the camera optical lens satisfies:

$-48.31 \leq f3/f \leq 3.67$;

$-1.70 \leq (R5+R6)/(R5-R6) \leq 16.12$; and $0.02 \leq d5/TTL \leq 0.12$, where f denotes the total focal length of the camera optical lens, f3 denotes a focal length of the third lens, R5 denotes a central curvature radius of an object side surface of the third lens, R6 denotes a central curvature radius of an image side surface of the third lens, d5 denotes an on-axis thickness of the third lens, and TTL denotes a total optical length from an object side surface of the first lens to an image plane of the camera optical lens along an optic axis.

As an improvement, the camera optical lens satisfies:

$0.54 \leq f4/f \leq 2.90$;

$-0.21 \leq (R7+R8)/(R7-R8) \leq 1.55$; and $0.04 \leq d7/TTL \leq 0.19$, where f denotes the total focal length of the camera optical lens, f4 denotes a focal length of the fourth lens, R7 denotes a central curvature radius of an object side surface of the fourth lens, R8 denotes a central curvature radius of an image side surface of the fourth lens, d7 denotes an on-axis thickness of the fourth lens, and TTL denotes a total optical length from an object side surface of the first lens to an image plane of the camera optical lens along an optic axis.

As an improvement, the camera optical lens satisfies:

$-6.11 \leq f5/f \leq -1.80$;

$-0.23 \leq (R9+R10)/(R9-R10) \leq 0.71$; and $0.02 \leq d9/TTL \leq 00.06$, where f denotes the total focal length of the camera optical lens, f5 denotes a focal length of the fifth lens, R9 denotes a central curvature radius of an object side surface of the fifth lens, R10 denotes a central curvature radius of an image side surface of the fifth lens, d9 denotes an on-axis thickness of the fifth lens, and TTL denotes a total optical length from an object side surface of the first lens to an image plane of the camera optical lens along an optic axis.

As an improvement, the camera optical lens satisfies:

$-17.21 \leq f6/f \leq -1.73$;

$-1.69 \leq (R11+R12)/(R11-R12) \leq -0.14$; and $0.04 \leq d11/TTL \leq 0.14$, where f denotes the total focal length of the camera optical lens, f6 denotes a focal length of the sixth lens, R11 denotes a central curvature radius of an object side surface of the sixth lens, R12 denotes a central curvature radius of an image side surface of the sixth lens, denotes an on-axis thickness of the sixth lens, and TTL denotes a total optical length from an object side surface of the first lens to an image plane of the camera optical lens along an optic axis.

As an improvement, the camera optical lens satisfies:

$0.41 \leq f7/f \leq 1.41$;

$0.26 \leq (R13+R14)/(R13-R14) \leq 1.12$; and $0.04 \leq d13/TTL \leq 0.13$, where f denotes the total focal length of the camera optical lens, f7 denotes a focal length of the seventh lens, R13 denotes a central curvature radius of an object side surface of the seventh lens is, R14 denotes a central curvature radius of an image side surface of the seventh lens, d13 denotes an on-axis thickness of the seventh lens, and TTL denotes a total optical length from an object side surface of the first lens to an image plane of the camera optical lens along an optic axis.

As an improvement, the camera optical lens satisfies:

$-2.69 \leq f8/f \leq -0.81$;

$1.16 \leq (R15+R16)/(R15-R16) \leq 4.06$; and $0.03 \leq d15/TTL \leq 0.11$, where f denotes the total focal length of the camera optical lens, f8 denotes a focal length of the eighth lens, R15 denotes a central curvature radius of an object side surface of the eighth lens, R16 denotes a central curvature radius of an image side surface of the eighth lens, d15 denotes an on-axis thickness of the eighth lens, and TTL denotes a total optical length from an object side surface of the first lens to an image plane of the camera optical lens along an optic axis.

The present disclosure has the following beneficial effects: the camera optical lens according to the present disclosure has good optical performance while having a large aperture, ultra-thinness, and a wide angle. At the same time, at least one of the first lens to the eighth lens includes a free-form surface, which can effectively correct aberration and further improve performance of an optical system. The camera optical lens is particularly applicable to mobile phone camera lens assemblies and WEB camera lenses composed of high pixel CCD, CMOS, and other camera elements.

BRIEF DESCRIPTION OF DRAWINGS

In order to more clearly illustrate technical solutions in embodiments of the present disclosure, the accompanying drawings used in the embodiments are briefly introduced as follows. Apparently, the drawings described as follows are merely part of the embodiments of the present disclosure, and other drawings can also be acquired by those of ordinary skill in the art without paying creative efforts. In the drawings.

DESCRIPTION OF EMBODIMENTS

To make the objectives, technical solutions, and advantages of the present disclosure clearer, embodiments of the present disclosure will be described in detail as follows with reference to FIG. 1 to FIG. 12. However, those of ordinary skill in the art can understand that many technical details have been put forward in each embodiment of the present disclosure in order to make readers better understand the present disclosure. Even without these technical details and various changes and modifications based on the following embodiments, the technical solutions claimed in the present disclosure can also be implemented.

First Embodiment

Figure 1:
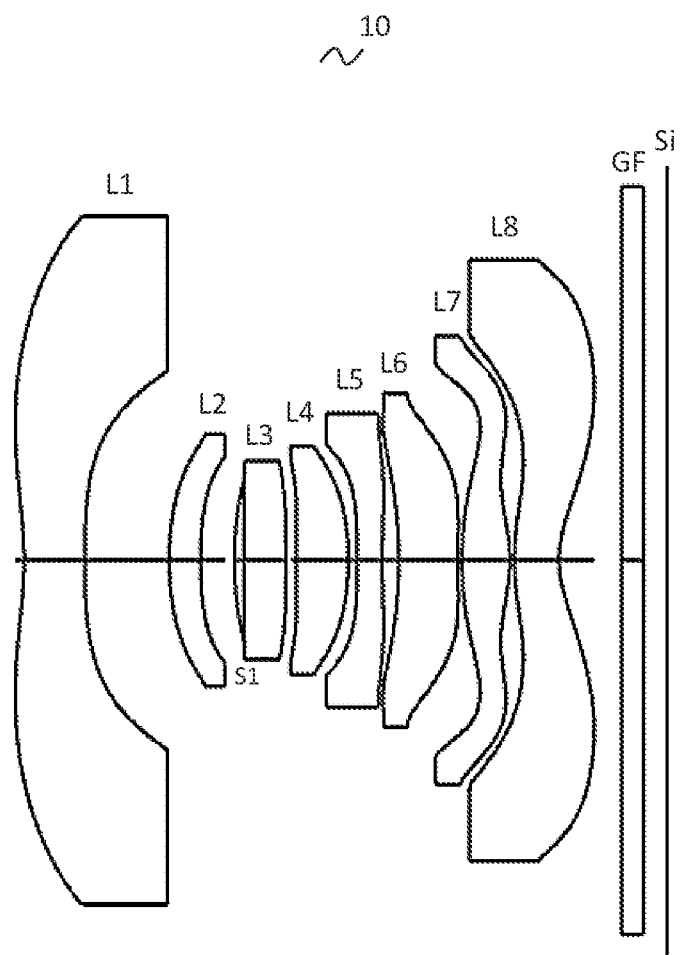
FIG. 1 is a schematic structural diagram of a camera optical lens according to a first embodiment of the present disclosure.

Referring to the drawings, a camera optical lens is provided according to the present disclosure. FIG. 1 illustrates a camera optical lens according to the first embodiment of the present disclosure. The camera optical lens includes eight lenses. Specifically, the camera optical lens includes a first lens L1, a second lens L2, an aperture S1, a third lens L3, a fourth lens L4, a fifth lens L5, a sixth lens L6, a seventh lens L7, and an eighth lens L8 successively from an object side to an image side. An optical element such as an optical filter GF may be provided between the eighth lens L8 and an image surface Si.

The first lens L1 has negative refractive power, the second lens L2 has positive refractive power, the third lens L3 has positive refractive power, the fourth lens L4 has positive refractive power, the fifth lens L5 has negative refractive power, the sixth lens L6 has negative refractive power, the seventh lens L7 has positive refractive power, and the eighth lens L8 has negative refractive power.

In this embodiment, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, the seventh lens L7 is made of a plastic material, and the eighth lens L8 is made of a plastic material. In other embodiments, the lenses may also be made of other materials.

In this embodiment, it is defined that at least one of the first lens L1 to the eighth lens L8 includes a free-form surface. The free-form surface is conducive to the correction of aberration such as astigmatism, field curvature, and distortion in a wide-angle optical system.

The first lens L1 has negative refractive power, which is conducive to implementing a wide angle of the system.

The second lens L2 has positive refractive power, which is conducive to implementing imaging performance of the system.

An object side surface of the eighth lens L8 is a convex surface at a paraxial position, and an image side surface thereof is a concave surface at the paraxial position, which specifies the shape of the eighth lens L8. Within the conditional range, it is conducive to correcting field curvature of the system and improving imaging quality.

When the camera optical lens 10 of the present disclosure includes at least one free-form surface, and when focal lengths of related lenses and central curvature radiuses of the related lenses satisfy the above relational expressions, the camera optical lens 10 can have high performance and meet requirements of a large aperture, a wide angle, and ultra-thinness.

An on-axis distance from an image side surface of the fourth lens L4 to an object side surface of the fifth lens L5 is defined as d8, and an on-axis thickness of the fifth lens is d9, which satisfy the following relational expression: $0.30 \leq d8/d9 \leq 1.00$. When d8/d9 satisfies the condition, it may help reduce the total length of the system.

In this embodiment, an object side surface of the first lens L1 is a concave surface at a paraxial position, and an image side surface thereof is a concave surface at the paraxial position.

A total focal length of the camera optical lens is defined as f, which satisfies the following relational expression: $-4.53 \leq f1/f \leq -1.30$. A ratio of the focal length of the first lens L1 to the total focal length is specified. Negative refractive power of the first lens L1 is controlled within a reasonable range, so as to help correct aberration of the optical system. In an embodiment, $-2.83 \leq f1/f \leq -1.62$ is satisfied.

A central curvature radius of the object side surface of the first lens L1 is R1, and a central curvature radius of the image side surface of the first lens L1 is R2, which satisfy the following relational expression: $-2.30 \leq (R1+R2)/(R1-R2) \leq -0.31$. The shape of the first lens L1 is reasonably controlled, so that spherical aberration of the system may be effectively corrected by the first lens L1. In an embodiment, $-1.44 \leq (R1+R2)/(R1-R2) \leq -0.39$ is satisfied.

An on-axis thickness of the first lens L1 is d1, and a total optical length of the camera optical lens is TTL, which satisfy the following relational expression: $0.04 \leq d1/TTL \leq 0.14$. This is conducive to implementation of ultra-thinness. Optionally, $0.07 \leq d1/TTL \leq 0.11$ is satisfied.

In this embodiment, an object side surface of the second lens L2 is a convex surface at a paraxial position, and an image side surface thereof is a concave surface at the paraxial position.

The following relational expression is satisfied: $2.10 \leq f2/f \leq 11.74$. A ratio of the focal length of the second lens L2 to the total focal length is specified. Within the specified range, the second lens L2 has appropriate positive refractive power, which is conducive to reducing system aberration, and is conducive to the development of ultra-thin and wide-angle lenses. Optionally, $3.36 \leq f2/f \leq 9.39$ is satisfied.

A central curvature radius of the object side surface of the second lens L2 is R3, and a central curvature radius of the image side surface of the second lens L2 is R4, which satisfy the following relational expression: $-14.09 \leq (R3+R4)/(R3-R4) \leq -2.21$. The shape of the second lens L2 is specified. Within this range, it is conducive to correcting the problem of longitudinal aberration with the development of ultra-thin and wide-angle lenses. In an embodiment, $-8.81 \leq (R3+R4)/(R3-R4) \leq -2.77$ is satisfied.

An on-axis thickness of the second lens L2 is d3, and a total optical length of the camera optical lens is TTL, which satisfy the following relational expression: $0.02 \leq d3/TTL \leq 0.10$. This is conducive to implementation of ultra-thinness. Optionally, $0.04 \leq d3/TTL \leq 0.08$ is satisfied.

In this embodiment, the third lens L3 has positive refractive power, an object side surface of the third lens L3 is a convex surface at a paraxial position, and an image side surface thereof is a convex surface at the paraxial position.

A focal length of the third lens L3 is defined as f3, which satisfies the following relational expression: $-48.31 \leq f3/f \leq 3.67$. The limitation on the third lens L3 can effectively flatten a light angle of the camera lens, and reduce the tolerance sensitivity. In an embodiment, $-30.19 \leq f3/f \leq 2.93$ is satisfied.

A central curvature radius of the object side surface of the third lens L3 is R5, and a central curvature radius of the image side surface of the third lens L3 is R6, which satisfy the following relational expression: $-1.70 \leq (R5+R6)/(R5-R6) \leq 16.12$. The shape of the third lens L3 is specified. Within the specified range of the conditional expression, it is conducive to correcting the problem of off-axis aberration with the development of ultra-thin and wide-angle lenses. In an embodiment, $-1.07 \leq (R5+R6)/(R5-R6) \leq 12.90$ is satisfied.

An on-axis thickness of the third lens L3 is d5, and a total optical length of the camera optical lens is TTL, which satisfy the following relational expression: $0.02 \leq d5/TTL \leq 0.12$. This is conducive to implementation of ultra-thinness. Optionally, $0.03 \leq d5/TTL \leq 0.10$ is satisfied.

In this embodiment, the fourth lens L4 has positive refractive power, an object side surface of the fourth lens L4 is a convex surface at a paraxial position, and an image side surface thereof is a convex surface at the paraxial position. In other optional embodiments, the fourth lens L4 may also have negative refractive power.

A focal length of the fourth lens L4 is defined as f4, which satisfies the following relational expression: $0.54 \leq f4/f \leq 2.90$. A ratio of the focal length of the fourth lens L4 to the total focal length is specified. It is conducive to improving performance of the optical system within the range of the conditional expression. In an embodiment, $0.86 \leq f4/f \leq 2.32$ is satisfied.

A central curvature radius of the object side surface of the fourth lens L4 is R7, and a central curvature radius of the image side surface of the fourth lens L4 is R8, which satisfy the following relational expression: $-0.21 \leq (R7+R8)/(R7-R8) \leq 1.55$. The shape of the fourth lens L4 is specified. In this range, it is conducive to correcting the problems such as off-axis aberration with the development of ultra-thinness and wide angle. In an embodiment, $-0.13 \leq (R7+R8)/(R7-R8) \leq 1.24$ is satisfied.

An on-axis thickness of the fourth lens L4 is d7, and a total optical length of the camera optical lens is TTL, which satisfy the following relational expression: $0.04 \leq d7/TTL \leq 0.19$. This is conducive to implementation of ultra-thinness. In an embodiment, $0.06 \leq d7/TTL \leq 0.15$ is satisfied.

In this embodiment, the fifth lens L5 has negative refractive power, an object side surface of the fifth lens L5 is a concave surface at a paraxial position, and an image side surface thereof is a concave surface at the paraxial position. In other optional embodiments, the fifth lens L5 may have positive refractive power.

A focal length of the fifth lens L5 is defined as f5, which satisfies the following relational expression: $-6.11 \leq f5/f \leq -1.80$. A ratio of the focal length of the fifth lens L5 to the total focal length is specified. It is conducive to improving performance of the optical system within the range of the conditional expression. In an embodiment, $-3.82 \leq f5/f \leq -2.25$ is satisfied.

A central curvature radius of the object side surface of the fifth lens L5 is R9, and a central curvature radius of the image side surface of the fifth lens L5 is R10, which satisfy the following relational expression: $-0.23 \leq (R9+R10)/(R9-R10) \leq 0.71$. The shape of the fifth lens L5 is specified. Within this range, it is conducive to correcting the problems such as off-axis aberration with the development of ultra-thinness and wide angle. In an embodiment, $-0.14 \leq (R9+R10)/(R9-R10) \leq 0.57$ is satisfied.

An on-axis thickness of the fifth lens L5 is d9, and a total optical length of the camera optical lens is TTL, which satisfy the following relational expression: $0.02 \leq d9/TTL \leq 0.06$. This is conducive to implementation of ultra-thinness. In an embodiment, $0.03 \leq d9/TTL \leq 0.05$ is satisfied.

In this embodiment, the sixth lens L6 has negative refractive power, an object side surface of the sixth lens L6 is a concave surface at a paraxial position, and an image side surface thereof is a concave surface at the paraxial position. In other optional embodiments, the sixth lens L6 may have positive refractive power.

A focal length of the sixth lens L6 is defined as f6, which satisfies the following relational expression: $-17.21 \leq f6/f \leq -1.73$. By reasonably distributing the refractive power, the system is enabled to have better imaging quality and low sensitivity. In an embodiment, $-10.76 \leq f6/f \leq -2.16$ is satisfied.

A central curvature radius of the object side surface of the sixth lens L6 is R11, and a central curvature radius of the image side surface of the sixth lens L6 is R12, which satisfy the following relational expression: $-1.69 \leq (R11+R12)/(R11-R12) \leq -0.14$. The shape of the sixth lens L6 is specified. Within the conditional range, it is conducive to correcting the problems such as off-axis aberration with the development of ultra-thinness and wide angle. In an embodiment, $-1.06 \leq (R11+R12)/(R11-R12) \leq -0.17$ is satisfied.

An on-axis thickness of the sixth lens L6 is d11, and a total optical length of the camera optical lens is TTL, which satisfy the following relational expression: $0.04 \leq d11/TTL \leq 0.14$. This is conducive to implementation of ultra-thinness. In an embodiment, $0.07 \leq d11/TTL \leq 0.11$ is satisfied.

In this embodiment, the seventh lens L7 has positive refractive power, an object side surface of the seventh lens L7 is a convex surface at a paraxial position, and an image side surface thereof is a convex surface at the paraxial position. In other optional embodiments, the seventh lens L7 may have negative refractive power.

A focal length of the seventh lens L7 is defined as f7, which satisfies the following relational expression: $0.41 \leq f7/f \leq 1.41$. In an embodiment, $0.66 \leq f7/f \leq 1.12$ is satisfied.

A central curvature radius of the object side surface of the seventh lens L7 is R13, and a central curvature radius of the image side surface of the seventh lens L7 is R14, which satisfy the following relational expression: $0.26 \leq (R13+R14)/(R13-R14) \leq 1.12$. The shape of the seventh lens L7 is specified. Within the conditional range, it is conducive to correcting the problems such as off-axis aberration with the development of ultra-thin and wide-angle lenses. In an embodiment, $0.42 \leq (R13+R14)/(R13-R14) \leq 0.90$ is satisfied.

An on-axis thickness of the seventh lens L7 is d13, and a total optical length of the camera optical lens is TTL, which satisfy the following relational expression: $0.04 \leq d13/TTL \leq 0.13$. This is conducive to implementation of ultra-thinness. In an embodiment, $0.06 \leq d13/TTL \leq 0.10$ is satisfied.

In this embodiment, the eighth lens L8 has negative refractive power, an object side surface of the eighth lens L8 is a convex surface at a paraxial position, and an image side surface thereof is a concave surface at the paraxial position. In other optional embodiments, the eighth lens L8 may have positive refractive power.

A focal length of the eighth lens L8 is defined as f8, which satisfies the following relational expression: $-2.69 \leq f8/f \leq -0.81$. By reasonably distributing the refractive power, the system is enabled to have better imaging quality and low sensitivity. In an embodiment, $-1.68 \leq f8/f \leq -1.01$ is satisfied.

A central curvature radius of the object side surface of the eighth lens L8 is R15, and a central curvature radius of the image side surface of the eighth lens L8 is R16, which satisfy the following relational expression: $1.16 \leq (R15+R16)/(R15-R16) \leq 4.06$. The shape of the eighth lens L8 is specified. Within the conditional range, it is conducive to correcting the problems such as off-axis aberration with the development of ultra-thinness and wide angle. In an embodiment, $1.85 \leq (R15+R16)/(R15-R16) \leq 3.25$ is satisfied.

An on-axis thickness of the eighth lens L8 is d15, and a total optical length of the camera optical lens is TTL, which satisfy the following relational expression: $0.03 \leq d15/TTL \leq 0.11$. This is conducive to implementation of ultra-thinness. In an embodiment, $0.05 \leq d15/TTL \leq 0.09$ is satisfied.

In this embodiment, an F number FNO of the camera optical lens 10 is less than or equal to 1.85, thereby having a large aperture and good imaging performance. In an embodiment, the F number FNO is less than or equal to 1.82.

In this embodiment, a ratio of the total optical length TTL of the camera optical lens 10 to a full field image height (in a diagonal direction) IH is less than or equal to 2.15, which is conducive to implementation of ultra-thinness. A field angle FOV in a diagonal direction is greater than or equal to 110°, which is conducive to implementation of a wide angle. In an embodiment, the FOV is greater than or equal to 118°.

When the above relations are satisfied, a free-form surface is adopted while the camera optical lens has good optical performance, so that a designed image surface area can be matched with an actual use area, and image quality of an effective area can be improved to the greatest extent. According to characteristics of the camera optical lens, the camera optical lens is particularly applicable to mobile phone camera lens assemblies and WEB camera lenses composed of high pixel CCD, CMOS, and other camera elements. The camera optical lens of the present disclosure will be described below with examples. Symbols listed in the examples are shown as below. The unit of the focal length, the on-axis distance, the central curvature radius, and the on-axis thickness is mm.

TTL: total optical length (an on-axis distance from the object side surface of the first lens L1 to an imaging surface Si), in units of mm.

F number FNO: ratio of an effective focal length of the camera optical lens to an entrance pupil diameter.

Table 1, Table 2, and Table 3 show design data of the camera optical lens 10 according to the first embodiment of the present disclosure. The object side surface and the image side surface of the eighth lens L8 are free-form surfaces.

TABLE 1

|  | R | d |  | nd |  | vd |
|---|---|---|---|---|---|---|
| S1 | ∞ | d0= −2.102 |  |  |  |  |
| R1 | −2.361 | d1= 0.582 | nd1 | 1.5444 | v1 | 56.43 |
| R2 | 20.491 | d2= 0.804 |  |  |  |  |
| R3 | 2.050 | d3= 0.300 | nd2 | 1.6610 | v2 | 20.53 |
| R4 | 2.836 | d4= 0.324 |  |  |  |  |
| R5 | 2.511 | d5= 0.493 | nd3 | 1.5444 | v3 | 56.43 |
| R6 | −31.516 | d6= 0.101 |  |  |  |  |
| R7 | 22.630 | d7= 0.495 | nd4 | 1.5444 | v4 | 56.43 |
| R8 | −1.788 | d8= 0.084 |  |  |  |  |
| R9 | −13.819 | d9= 0.240 | nd5 | 1.6800 | v5 | 18.40 |
| R10 | 4.898 | d10= 0.158 |  |  |  |  |
| R11 | −3.283 | d11= 0.567 | nd6 | 1.5444 | v6 | 56.43 |
| R12 | 12.184 | d12= 0.040 |  |  |  |  |
| R13 | 3.276 | d13= 0.457 | nd7 | 1.5444 | v7 | 56.43 |
| R14 | −1.030 | d14= 0.040 |  |  |  |  |
| R15 | 1.702 | d15= 0.426 | nd8 | 1.6032 | v8 | 28.29 |
| R16 | 0.674 | d16= 0.600 |  |  |  |  |
| R17 | ∞ | d17= 0.210 | ndg | 1.5168 | vg | 64.17 |
| R18 | ∞ | d18= 0.228 |  |  |  |  |

Meanings of the symbols are as follows.
S1: aperture;
R: curvature radius at a center of an optical surface;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of the object side surface of the sixth lens L6;
R12: central curvature radius of the image side surface of the sixth lens L6;
R13: central curvature radius of the object side surface of the seventh lens L7;
R14: central curvature radius of the image side surface of the seventh lens L7;
R15: central curvature radius of the object side surface of the eighth lens L8;
R16: central curvature radius of the image side surface of the eighth lens L8;
R17: central curvature radius of the object side surface of the optical filter GF;
R18: central curvature radius of the image side surface of the optical filter GF;
d: on-axis thickness of the lens and on-axis distance between the lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the eighth lens L8;
d15: on-axis thickness of the eighth lens L8;
d16: on-axis distance from the image side surface of the eighth lens L8 to the object side surface of the optical filter GF;
d17: on-axis thickness of the optical filter GF;
d18: on-axis distance from the image side surface of the optical filter GF to the image surface Si;
nd: refractive index of d-line;
nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of the d-line of the fifth lens L5;
nd6: refractive index of d-line of the sixth lens L6;
nd7: refractive index of d-line of the seventh lens L7;
nd8: refractive index of d-line of the eighth lens L8;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8; and
vg: abbe number of the optical filter GF.

Table 2 shows aspheric data of respective lenses in the camera optical lens 10 according to the first embodiment of the present disclosure.

TABLE 2

| | Conic coefficient | Aspheric coefficient | | | | |
|---|---|---|---|---|---|---|
| | k | A4 | A6 | A8 | A10 | A12 |
| R1 | −2.0585E+01 | 7.7936E−02 | −3.7492E−02 | 1.4878E−02 | −4.3798E−03 | 9.2012E−04 |
| R2 | −1.0000E+01 | 2.8251E−01 | −2.9433E−01 | 4.3308E−01 | −5.3660E−01 | 4.9089E−01 |
| R3 | −6.0277E−01 | 6.2323E−02 | 2.1342E−01 | −1.1981E+00 | 4.3452E+00 | −8.9042E+00 |
| R4 | 8.7430E+00 | 1.0698E−01 | −1.4843E−01 | 1.1009E+00 | −2.8141E+00 | 3.8530E+00 |
| R5 | −1.2413E+00 | 4.1284E−02 | 3.8717E−02 | −8.6690E−02 | 2.1106E−01 | −2.0051E−01 |
| R6 | 1.0000E+01 | −1.4361E−01 | −1.1074E−01 | 2.5245E−01 | −4.8479E−01 | 1.2382E+00 |
| R7 | 3.6310E+00 | −1.1530E−01 | −2.4999E−01 | 3.9446E−01 | −7.4218E−01 | 1.3740E+00 |
| R8 | 9.4156E−01 | −3.8155E−02 | −3.3493E−01 | 8.0380E−01 | −1.4437E+00 | 2.0216E+00 |
| R9 | 1.0000E+01 | −3.1016E−01 | −1.6918E−01 | −8.1254E−02 | 1.1521E+00 | −1.7782E+00 |
| R10 | −9.3703E+00 | −1.7911E−01 | −1.2067E−02 | 6.6392E−02 | −1.3669E−02 | 9.3595E−02 |
| R11 | −7.6778E+00 | −7.2985E−02 | 1.4276E−01 | −7.2076E−02 | −5.9935E−01 | 1.4937E+00 |
| R12 | −1.0000E+01 | −7.4965E−02 | −1.5338E+00 | 3.2791E+00 | −3.2720E+00 | 1.3901E+00 |
| R13 | 1.4871E+00 | 3.8179E−01 | −1.2326E+00 | 2.2083E+00 | −2.5199E+00 | 1.6873E+00 |
| R14 | −6.9291E−01 | 9.2928E−01 | −6.2584E−01 | 3.6093E−01 | −4.5988E−01 | 4.8219E−01 |

| | Conic coefficient | Aspheric coefficient | | | | |
|---|---|---|---|---|---|---|
| | k | A14 | A16 | A18 | A20 | / |
| R1 | −2.0585E+01 | −1.3250E−04 | 1.2373E−05 | −6.7412E−07 | 1.6317E−08 | / |
| R2 | −1.0000E+01 | −3.0458E−01 | 1.2011E−01 | −2.6925E−02 | 2.5849E−03 | / |
| R3 | −6.0277E−01 | 1.0556E+01 | −6.6900E+00 | 1.7047E+00 | 0.0000E+00 | / |
| R4 | 8.7430E+00 | −1.6640E+00 | −8.0299E−01 | 0.0000E+00 | 0.0000E+00 | / |
| R5 | −1.2413E+00 | 0.0000E+00 | 0.0000E+00 | 0.0000E+00 | 0.0000E+00 | / |
| R6 | 1.0000E+01 | −9.6046E−01 | 0.0000E+00 | 0.0000E+00 | 0.0000E+00 | / |
| R7 | 3.6310E+00 | −7.5507E−01 | 0.0000E+00 | 0.0000E+00 | 0.0000E+00 | / |
| R8 | 9.4156E−01 | −1.8471E+00 | 8.3857E−01 | 0.0000E+00 | 0.0000E+00 | / |
| R9 | 1.0000E+01 | 8.4740E−01 | 0.0000E+00 | 0.0000E+00 | 0.0000E+00 | / |
| R10 | −9.3703E+00 | −1.0666E−01 | 3.0841E−02 | 0.0000E+00 | 0.0000E+00 | / |
| R11 | −7.6778E+00 | −1.4095E+00 | 6.0995E−01 | −1.0194E−01 | 0.0000E+00 | / |
| R12 | −1.0000E+01 | 3.7657E−01 | −7.2790E−01 | 3.2164E−01 | −5.0090E−02 | / |
| R13 | 1.4871E+00 | −6.1360E−01 | 8.8166E−02 | 7.6920E−03 | −2.6558E−03 | / |
| R14 | −6.9291E−01 | −2.8631E−01 | 9.5182E−02 | −1.6669E−02 | 1.2024E−03 | / |

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1)$$

In the formula (1), k is the conic coefficient, A4, A6, A8, A10, A12, A14, A16, A18, and A20 are aspheric coefficients, c is a curvature at the central of the optical surface, r is a vertical distance between a point on an aspheric curve and an optic axis, and z is an aspheric depth (a vertical distance between a point having a distance of r from the optical axis on an aspheric surface and a tangent plane tangent to a vertex on an aspheric optic axis).

For convenience, the aspheric surface of each lens surface uses the aspheric surface shown in the above formula (1). However, the present disclosure is not limited to the aspheric polynomial form represented by the formula (1).

Table 3 shows data of free-form surfaces in the camera optical lens 10 according to the first embodiment of the present disclosure.

TABLE 3

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R15 | −1.4026E+00 | −1.2791E−01 | −2.5721E−01 | −1.2879E−01 | −6.2240E−01 | −1.8678E+00 | −1.8640E+00 | −6.2153E−01 |
| R16 | −3.5609E+00 | −1.9709E−01 | −3.9464E−01 | −1.9793E−01 | 1.0549E−01 | 3.1636E−01 | 3.1718E−01 | 1.0669E−01 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R15 | 1.2142E+00 | 4.8598E+00 | 7.2880E+00 | 4.8547E+00 | 1.2142E+00 | −1.1099E+00 | −5.5501E+00 | −1.1100E+01 |
| R16 | −1.8640E−02 | −7.4269E−02 | −1.1114E−01 | −7.4453E−02 | −1.9520E−02 | −1.5604E−02 | −7.8020E−02 | −1.5585E−01 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R15 | −1.1101E+01 | −5.5484E+00 | −1.1104E+00 | 5.8128E−01 | 3.4873E+00 | 8.7184E+00 | 1.1625E+01 | 8.7189E+00 |
| R16 | −1.5675E−01 | −7.8179E−02 | −1.5381E−02 | 1.2175E−02 | 7.3022E−02 | 1.8248E−01 | 2.4348E−01 | 1.8260E−01 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R15 | 3.4882E+00 | 5.8158E−01 | −1.8072E−01 | −1.2651E+00 | −3.7952E+00 | −6.3255E+00 | −6.3251E+00 | −3.7951E+00 |
| R16 | 7.3152E−02 | 1.2190E−02 | −3.9267E−03 | −2.7484E−02 | −8.2475E−02 | −1.3743E−01 | −1.3739E−01 | −8.2406E−02 |

TABLE 3-continued

Free-form surface coefficient

| | k | $X^4Y^0$ | $X^2Y^2$ | $X^0Y^4$ | $X^6Y^0$ | $X^4Y^2$ | $X^2Y^4$ | $X^0Y^6$ |
|---|---|---|---|---|---|---|---|---|
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R15 | −1.2654E+00 | −1.8072E−01 | 3.2351E−02 | 2.5891E−01 | 9.0613E−01 | 1.8121E+00 | 2.2655E+00 | 1.8121E+00 |
| R16 | −2.7473E−02 | −3.9266E−03 | 6.8216E−04 | 5.4583E−03 | 1.9106E−02 | 3.8223E−02 | 4.7737E−02 | 3.8230E−02 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R15 | 9.0607E−01 | 2.5863E−01 | 3.2373E−02 | −2.9877E−03 | −2.6849E−02 | −1.0741E−01 | −2.5058E−01 | −3.7593E−01 |
| R16 | 1.9096E−02 | 5.4441E−03 | 6.7549E−04 | −6.2623E−05 | −5.6349E−04 | −2.2531E−03 | −5.2546E−03 | −7.8920E−03 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R15 | −3.7589E−01 | −2.5092E−01 | −1.0736E−01 | −2.6902E−02 | −3.0292E−03 | 1.0424E−04 | 1.0261E−03 | 4.6045E−03 |
| R16 | −7.8916E−03 | −5.2567E−03 | −2.2636E−03 | −5.6779E−04 | −6.1331E−05 | 2.3943E−06 | 2.3900E−05 | 1.0745E−04 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R15 | 1.2374E−02 | 2.1484E−02 | 2.5793E−02 | 2.1722E−02 | 1.2374E−02 | 4.5356E−03 | 1.1212E−03 | 1.1302E−04 |
| R16 | 2.8579E−04 | 5.0181E−04 | 6.0376E−04 | 5.0004E−04 | 2.8779E−04 | 1.0826E−04 | 2.6236E−05 | 2.3321E−06 |

$$z = \frac{cr^2}{1+\sqrt{1-(1+k)c^2r^2}} + \sum_{i=1}^{N} B_i E_i(x,y) \quad (2)$$

In the formula (2), k is a conic coefficient, Bi is a free-form surface coefficient, c is a curvature at the center of the optical surface, r is a vertical distance between a point on a free-form surface and an optic axis, x is an x-direction component of r, y is a y-direction component of r, and z is an aspheric depth (a vertical distance between a point having a distance of r from the optical axis on an aspheric surface and a tangent plane tangent to a vertex on an aspheric optic axis).

For convenience, each free-form surface uses the extended polynomial shown in the above formula (2). However, the present disclosure is not limited to the extended polynomial form represented by the formula (2).

Figure 2:
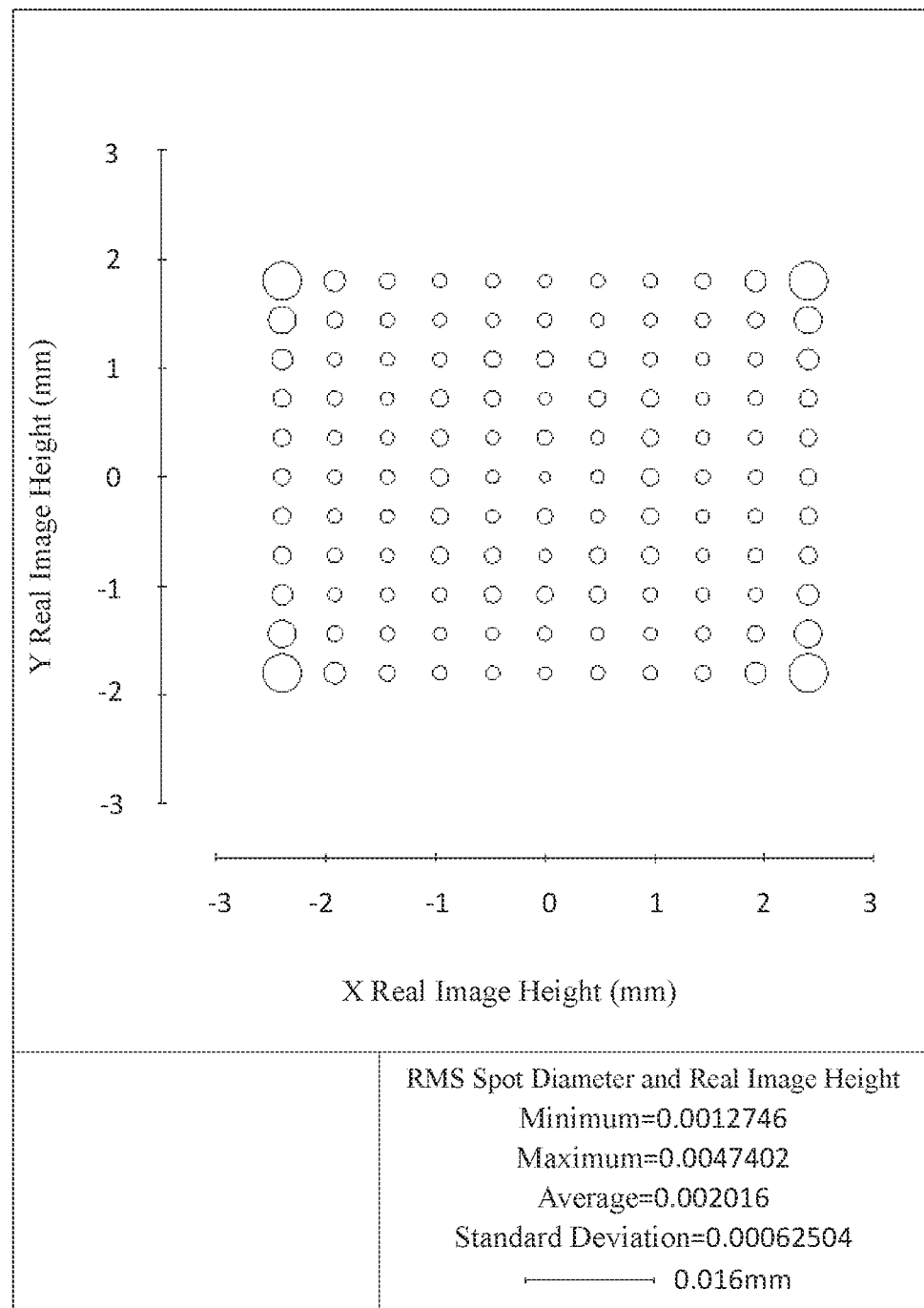
FIG. 2 shows a case where an RMS spot diameter of the camera optical lens shown in FIG. 1 is in a first quadrant.
Figure 3:
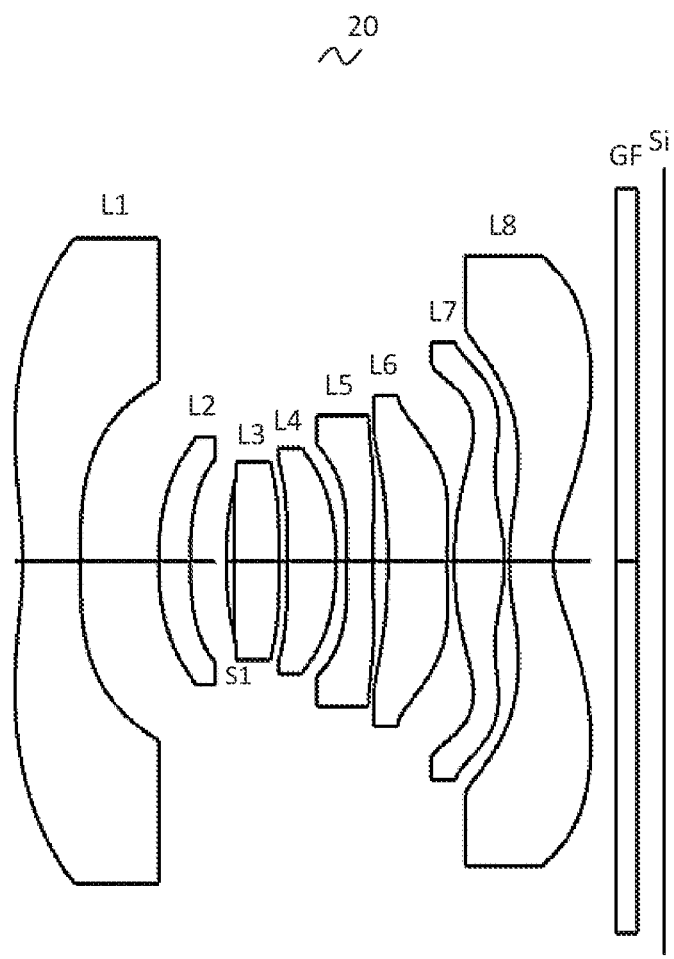
FIG. 3 is a schematic structural diagram of a camera optical lens according to a second embodiment of the present disclosure.

FIG. 2 shows a case where an RMS spot diameter of the camera optical lens 10 according to the first embodiment is in a first quadrant. It can be known according to FIG. 2 that the camera optical lens 10 according to the first embodiment can achieve good imaging quality.

Table 19 below shows various values in first, second, third, fourth, fifth and sixth embodiments and values corresponding to parameters specified in the conditional expressions.

As shown in Table 19, the camera optical lens of the first embodiment satisfies the conditional expressions.

In this embodiment, the camera optical lens 10 has an entrance pupil diameter ENPD of 1.000 mm, a full field image height (in a diagonal direction) IH of 6.000 mm, an image height of 4.800 mm in an x direction, and an image height of 3.600 mm in a y direction. Within the rectangular rang, the imaging effect is optimal. A field of view FOV in a diagonal direction is 119.99°, a field of view in the x direction is 107.19°, and a field of view in the y direction is 90.49°. The camera optical lens 10 meets design requirements of a wide angle, ultra-thinness, and a large aperture, has fully corrected on-axis and off-axis chromatic aberration, and has excellent optical characteristics.

Second Embodiment

The second embodiment is basically the same as the first embodiment. Symbols have the same meanings as those in the first embodiment. Only differences therebetween will be listed below.

In this embodiment, the object side surface of the fourth lens L4 is a concave surface at the paraxial position.

Table 4, Table 5 and Table 6 show design data of the camera optical lens 20 according to the second embodiment of the present disclosure. The object side surface and the image side surface of the first lens L1 are free-form surfaces.

TABLE 4

| | R | d | | nd | | vd |
|---|---|---|---|---|---|---|
| S1 | ∞ | d0= −2.033 | | | | |
| R1 | −2.406 | d1= 0.552 | nd1 | 1.5444 | v1 | 56.43 |
| R2 | 15.423 | d2= 0.749 | | | | |
| R3 | 2.007 | d3= 0.303 | nd2 | 1.6610 | v2 | 20.53 |
| R4 | 2.671 | d4= 0.347 | | | | |
| R5 | 2.655 | d5= 0.511 | nd3 | 1.5444 | v3 | 56.43 |
| R6 | −11.174 | d6= 0.074 | | | | |
| R7 | −112.028 | d7= 0.472 | nd4 | 1.5444 | v4 | 56.43 |
| R8 | −1.872 | d8= 0.104 | | | | |
| R9 | −11.001 | d9= 0.240 | nd5 | 1.6800 | v5 | 18.40 |
| R10 | 5.220 | d10= 0.146 | | | | |
| R11 | −5.024 | d11= 0.571 | nd6 | 1.5444 | v6 | 56.43 |
| R12 | 7.578 | d12= 0.069 | | | | |
| R13 | 3.247 | d13= 0.483 | nd7 | 1.5444 | v7 | 56.43 |
| R14 | −1.025 | d14= 0.040 | | | | |
| R15 | 1.543 | d15= 0.426 | nd8 | 1.6032 | v8 | 28.29 |
| R16 | 0.641 | d16= 0.600 | | | | |
| R17 | ∞ | d17= 0.210 | ndg | 1.5168 | vg | 64.17 |
| R18 | ∞ | d18= 0.253 | | | | |

Table 5 shows aspheric data of respective lenses in the camera optical lens 20 according to the second embodiment of the present disclosure.

TABLE 5

| | Conic coefficient | Aspheric coefficient | | | | |
|---|---|---|---|---|---|---|
| | k | A4 | A6 | A8 | A10 | A12 |
| R3 | −7.0874E−01 | 7.6513E−02 | 2.0135E−01 | −1.1242E+00 | 4.1815E+00 | −8.7343E+00 |
| R4 | 7.7426E+00 | 1.1824E−01 | −1.4774E−01 | 1.1642E+00 | −3.1471E+00 | 4.6805E+00 |
| R5 | −2.0431E+00 | 4.6079E−02 | 4.4847E−02 | −1.2899E−01 | 2.8875E−01 | −2.7479E−01 |
| R6 | 7.8971E+00 | −1.6248E−01 | −1.8424E−01 | 7.9568E−01 | −1.7893E+00 | 2.7269E+00 |
| R7 | −1.0000E+01 | −1.6083E−01 | −1.8895E−01 | 3.1206E−02 | 1.0536E+00 | −2.5144E+00 |
| R8 | 1.3072E+00 | −7.1494E−02 | −2.2435E−01 | 4.1929E−01 | −3.1808E−01 | −2.5527E−01 |
| R9 | 9.0119E−01 | −2.8583E−01 | −2.9875E−01 | 7.6693E−01 | −1.4770E+00 | 2.8056E+00 |
| R10 | −6.7274E+00 | −1.6363E−01 | −8.1857E−02 | 3.5040E−01 | −6.4547E−01 | 8.9739E−01 |
| R11 | 9.9900E−01 | −1.1145E−01 | 1.9356E−01 | −1.0819E−01 | −5.6115E−01 | 1.3959E+00 |
| R12 | −1.0000E+01 | −4.7770E−02 | −1.5281E+00 | 3.0210E+00 | −2.7902E+00 | 9.9073E−01 |
| R13 | 2.1136E+00 | 4.7872E−01 | −1.4795E+00 | 2.4914E+00 | −2.6796E+00 | 1.7045E+00 |
| R14 | −6.8719E−01 | 8.8583E−01 | −6.3720E−01 | 5.3925E−01 | −7.3733E−01 | 6.9631E−01 |
| R15 | −1.4515E+00 | −2.4906E−01 | −3.2352E−01 | 7.8507E−01 | −7.0059E−01 | 3.2748E−01 |
| R16 | −3.5884E+00 | −2.0792E−01 | 1.4154E−01 | −6.0877E−02 | 1.3973E−02 | −6.0598E−04 |
| | Conic coefficient | Aspheric coefficient | | | | |
| | k | A14 | A16 | A18 | A20 | / |
| R3 | −7.0874E−01 | 1.0534E+01 | −6.7877E+00 | 1.7532E+00 | 0.0000E+00 | / |
| R4 | 7.7426E+00 | −2.6352E+00 | −4.7371E−01 | 0.0000E+00 | 0.0000E+00 | / |
| R5 | −2.0431E+00 | 0.0000E+00 | 0.0000E+00 | 0.0000E+00 | 0.0000E+00 | / |
| R6 | 7.8971E+00 | −1.6037E+00 | 0.0000E+00 | 0.0000E+00 | 0.0000E+00 | / |
| R7 | −1.0000E+01 | 3.0588E+00 | −1.3811E+00 | 0.0000E+00 | 0.0000E+00 | / |
| R8 | 1.3072E+00 | 1.0955E+00 | −1.4398E+00 | 7.7674E−01 | 0.0000E+00 | / |
| R9 | 9.0119E−01 | −3.6617E+00 | 2.3290E+00 | −4.9350E−01 | 0.0000E+00 | / |
| R10 | −6.7274E+00 | −7.1367E−01 | 2.8367E−01 | −4.4244E−02 | 0.0000E+00 | / |
| R11 | 9.9900E−01 | −1.2978E+00 | 5.5629E−01 | −9.2551E−02 | 0.0000E+00 | / |
| R12 | −1.0000E+01 | 5.1695E−01 | −7.1352E−01 | 2.9607E−01 | −4.4685E−02 | / |
| R13 | 2.1136E+00 | −5.8601E−01 | 7.5411E−02 | 9.1011E−03 | −2.5681E−03 | / |
| R14 | −6.8719E−01 | −3.8211E−01 | 1.2064E−01 | −2.0454E−02 | 1.4493E−03 | / |
| R15 | −1.4515E+00 | −8.1328E−02 | 8.8038E−03 | 8.8407E−05 | −6.6287E−05 | / |
| R16 | −3.5884E+00 | −5.2024E−04 | 1.3717E−04 | −1.4548E−05 | 5.9359E−07 | / |

Table 6 shows data of free-form surfaces in the camera optical lens 20 according to the second embodiment of the present disclosure.

TABLE 6

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^3Y^4$ | $X^0Y^6$ |
| R1 | −2.2248E+01 | 8.3136E−02 | 1.6639E−01 | 8.3258E−02 | −4.1376E−02 | −1.2434E−01 | −1.2421E−01 | −4.1498E−02 |
| R2 | −8.8973E+00 | 2.9440E−01 | 5.9046E−01 | 2.9502E−01 | −3.1058E−01 | −9.3792E−01 | −9.3654E−01 | −3.1178E−01 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R1 | 1.7029E−02 | 6.8211E−02 | 1.0226E−01 | 6.8128E−02 | 1.7062E−02 | −5.1819E−03 | −2.5927E−02 | −5.1831E−02 |
| R2 | 4.6465E−01 | 1.8668E+00 | 2.7979E+00 | 1.8648E+00 | 4.6504E−01 | −5.7873E−01 | −2.8966E+00 | −5.7906E+00 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R1 | −5.1814E−02 | −2.5896E−02 | −5.1773E−03 | 1.1240E−03 | 6.7448E−03 | 1.6857E−02 | 2.2477E−02 | 1.6855E−02 |
| R2 | −5.7912E+00 | −2.8973E+00 | −5.7808E−01 | 5.3155E−01 | 3.1876E+00 | 7.9601E+00 | 1.0632E+01 | 7.9659E+00 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R1 | 6.7399E−03 | 1.1223E−03 | −1.6698E−04 | −1.1686E−03 | −3.5063E−03 | −5.8446E−03 | −5.8440E−03 | −3.5062E−03 |
| R2 | 3.1913E+00 | 5.3102E−01 | −3.3007E−01 | −2.3096E+00 | −6.9224E+00 | −1.1551E+01 | −1.1550E+01 | −6.9293E+00 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R1 | −1.1705E−03 | −1.6732E−04 | 1.6078E−05 | 1.2858E−04 | 4.5048E−04 | 9.0016E−04 | 1.1254E−03 | 9.0160E−04 |
| R2 | −2.3110E+00 | −3.3002E−01 | 1.3011E−01 | 1.0408E+00 | 3.6436E+00 | 7.2864E+00 | 9.1138E+00 | 7.2852E+00 |

TABLE 6-continued

Free-form surface coefficient

| | k | $X^4Y^0$ | $X^2Y^2$ | $X^0Y^4$ | $X^6Y^0$ | $X^4Y^2$ | $X^3Y^4$ | $X^0Y^6$ |
|---|---|---|---|---|---|---|---|---|
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R1 | 4.4943E−04 | 1.2894E−04 | 1.6138E−05 | −9.0537E−07 | −8.1475E−06 | −3.2487E−05 | −7.5878E−05 | −1.1386E−04 |
| R2 | 3.6458E+00 | 1.0405E+00 | 1.3019E−01 | −2.9108E−02 | −2.6189E−01 | −1.0443E+00 | −2.4465E+00 | −3.6656E+00 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R1 | −1.1370E−04 | −7.6055E−05 | −3.2167E−05 | −7.9753E−06 | −8.8810E−07 | 2.2878E−08 | 2.2981E−07 | 9.9604E−07 |
| R2 | −3.6610E+00 | −2.4443E+00 | −1.0486E+00 | −2.6235E−01 | −2.9100E−02 | 2.7768E−03 | 2.7767E−02 | 1.2234E−01 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R1 | 2.7308E−06 | 4.7536E−06 | 5.5863E−06 | 4.8924E−06 | 2.5682E−06 | 1.0117E−06 | 1.9538E−07 | 2.0225E−08 |
| R2 | 3.3255E−01 | 5.7981E−01 | 6.9533E−01 | 5.7654E−01 | 3.3324E−01 | 1.2511E−01 | 2.8111E−02 | 2.7532E−03 |

Figure 4:
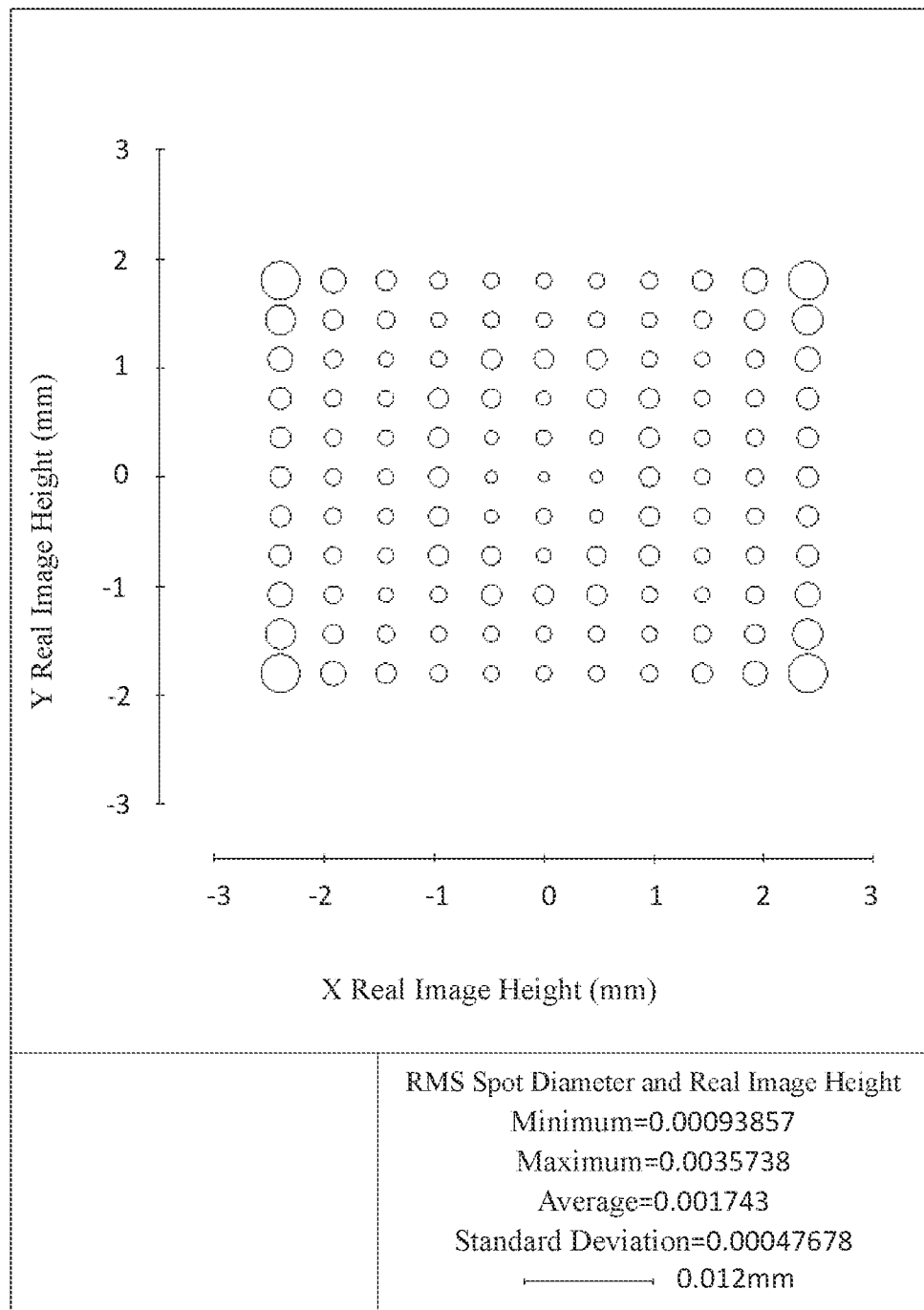
FIG. 4 shows a case where an RMS spot diameter of the camera optical lens shown in FIG. 3 is in a first quadrant.
Figure 5:
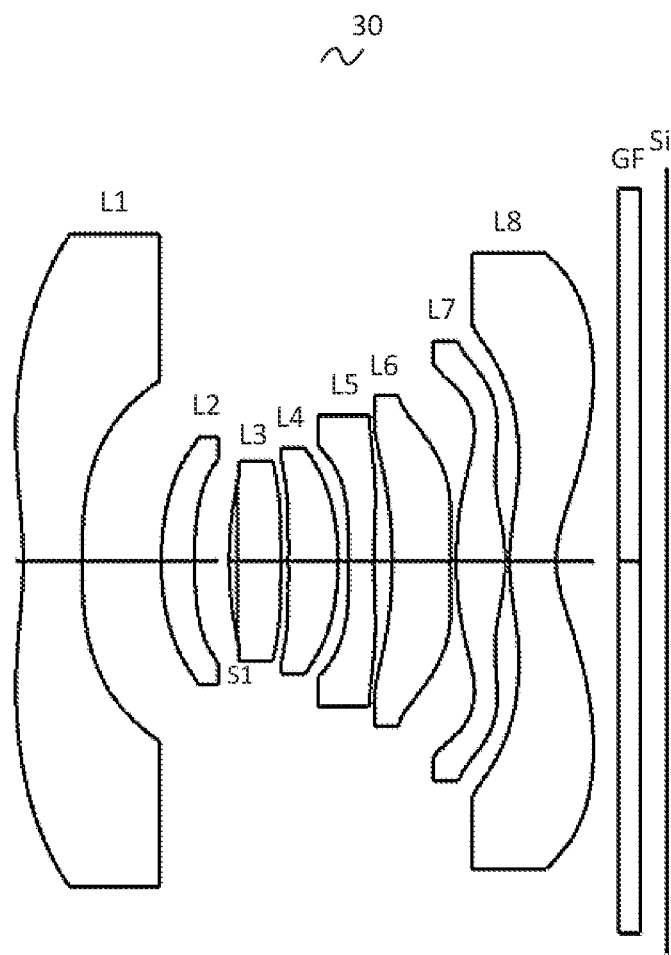
FIG. 5 is a schematic structural diagram of a camera optical lens according to a third embodiment of the present disclosure.

FIG. 4 shows a case where an RMS spot diameter of the camera optical lens 20 according to the second embodiment is in a first quadrant. It can be known according to FIG. 4 that the camera optical lens 20 according to the second embodiment can achieve good imaging quality.

As shown in Table 19, the camera optical lens of the second embodiment satisfies the conditional expressions.

In this embodiment, the camera optical lens 20 has an entrance pupil diameter ENPD of 1.000 mm, a full field image height (in a diagonal direction) IH of 6.000 mm, an image height of 4.800 mm in an x direction, and an image height of 3.600 mm in a y direction. Within the rectangular rang, the imaging effect is optimal. The field of view FOV in a diagonal direction is 120.00°, the field of view in the x direction is 107.30°, and the field of view in the y direction is 90.78°. The camera optical lens 20 meets design requirements of a wide angle, ultra-thinness, and a large aperture, has fully corrected on-axis and off-axis chromatic aberration, and has excellent optical characteristics.

Third Embodiment

The third embodiment is basically the same as the first embodiment. Symbols have the same meanings as those in the first embodiment. Only differences therebetween will be listed below.

Table 7, Table 8 and Table 9 show design data of the camera optical lens 30 according to the third embodiment of the present disclosure. The object side surface and the image side surface of the third lens L3 are free-form surfaces.

TABLE 7

| | R | d | | nd | | vd |
|---|---|---|---|---|---|---|
| S1 | ∞ | d0= | −2.043 | | | |
| R1 | −2.665 | d1= | 0.565 | nd1 | 1.5444 | v1 | 56.43 |
| R2 | 7.277 | d2= | 0.756 | | | |
| R3 | 1.932 | d3= | 0.316 | nd2 | 1.6610 | v2 | 20.53 |
| R4 | 2.929 | d4= | 0.333 | | | |
| R5 | 2.799 | d5= | 0.495 | nd3 | 1.5444 | v3 | 56.43 |
| R6 | −15.999 | d6= | 0.071 | | | |
| R7 | 124.684 | d7= | 0.476 | nd4 | 1.5444 | v4 | 56.43 |
| R8 | −1.852 | d8= | 0.100 | | | |
| R9 | −11.872 | d9= | 0.240 | nd5 | 1.6800 | v5 | 18.40 |
| R10 | 5.583 | d10= | 0.171 | | | |
| R11 | −3.382 | d11= | 0.560 | nd6 | 1.5444 | v6 | 56.43 |
| R12 | 12.834 | d12= | 0.055 | | | |
| R13 | 3.339 | d13= | 0.470 | nd7 | 1.5444 | v7 | 56.43 |
| R14 | −1.023 | d14= | 0.040 | | | |
| R15 | 1.630 | d15= | 0.441 | nd8 | 1.6032 | v8 | 28.29 |
| R16 | 0.665 | d16= | 0.600 | | | |
| R17 | ∞ | d17= | 0.210 | ndg | 1.5168 | vg | 64.17 |
| R18 | ∞ | d18= | 0.250 | | | |

Table 8 shows aspheric data of respective lenses in the camera optical lens 30 according to the third embodiment of the present disclosure.

TABLE 8

| | Conic coefficient | Aspheric coefficient | | | | |
|---|---|---|---|---|---|---|
| | k | A4 | A6 | A8 | A10 | A12 |
| R1 | −2.5000E+01 | 8.1991E−02 | −4.3186E−02 | 1.8381E−02 | −5.8029E−03 | 1.3120E−03 |
| R2 | −1.0000E+01 | 2.6488E−01 | −2.3497E−01 | 2.9289E−01 | −3.2289E−01 | 2.7152E−01 |
| R3 | −7.0411E−01 | 5.6781E−02 | 2.9244E−01 | −1.5949E+00 | 5.5706E+00 | −1.1163E+01 |
| R4 | 9.5270E+00 | 1.1948E−01 | −1.8641E−01 | 1.3431E+00 | −3.5660E+00 | 5.0924E+00 |
| R7 | 1.0000E+01 | −1.3264E−01 | −2.3850E−01 | 3.4700E−01 | −6.5749E−01 | 2.5716E+00 |
| R8 | 1.1140E+00 | −4.4773E−02 | −3.1590E−01 | 1.1097E+00 | −3.1815E+00 | 6.0013E+00 |
| R9 | −1.0000E+01 | −2.7813E−01 | −4.3223E−01 | 1.7089E+00 | −4.6557E+00 | 8.2473E+00 |
| R10 | −7.5905E+00 | −1.4555E−01 | −2.3038E−01 | 8.8780E−01 | −1.8345E+00 | 2.6020E+00 |
| R11 | −4.0733E+00 | −4.5567E−02 | 2.2192E−02 | 2.8678E−02 | −4.9533E−01 | 1.2424E+00 |
| R12 | −8.1824E+00 | 6.3738E−03 | −1.5937E+00 | 3.0050E+00 | −2.6439E+00 | 7.3367E−01 |
| R13 | 2.3574E+00 | 4.6554E−01 | −1.4764E+00 | 2.5411E+00 | −2.8095E+00 | 1.8668E+00 |
| R14 | −6.8933E−01 | 8.5281E−01 | −6.3474E−01 | 5.8006E−01 | −7.7626E−01 | 7.1024E−01 |
| R15 | −1.1859E+00 | −2.3244E−01 | −3.4346E−01 | 7.9953E−01 | −7.1564E−01 | 3.5216E−01 |
| R16 | −3.8095E+00 | −1.8671E−01 | 1.1277E−01 | −3.6965E−02 | 2.8507E−03 | 2.3484E−03 |

TABLE 8-continued

| | Conic coefficient | Aspheric coefficient | | | | |
|---|---|---|---|---|---|---|
| | k | A14 | A16 | A18 | A20 | / |
| R1 | −2.5000E+01 | −2.0391E−04 | 2.0573E−05 | −1.2092E−06 | 3.1404E−08 | / |
| R2 | −1.0000E+01 | −1.5596E−01 | 5.6895E−02 | −1.1709E−02 | 1.0134E−03 | / |
| R3 | −7.0411E−01 | 1.2998E+01 | −8.0925E+00 | 2.0267E+00 | 0.0000E+00 | / |
| R4 | 9.5270E+00 | −2.5531E+00 | −6.8505E−01 | 0.0000E+00 | 0.0000E+00 | / |
| R7 | 1.0000E+01 | −4.5735E+00 | 4.0915E+00 | −1.5106E+00 | 0.0000E+00 | / |
| R8 | 1.1140E+00 | −6.3186E+00 | 3.1008E+00 | −3.5131E−01 | 0.0000E+00 | / |
| R9 | −1.0000E+01 | −8.5013E+00 | 4.2394E+00 | −6.5596E−01 | 0.0000E+00 | / |
| R10 | −7.5905E+00 | −2.2720E+00 | 1.1544E+00 | −3.1469E−01 | 3.5686E−02 | / |
| R11 | −4.0733E+00 | −1.2238E+00 | 5.4965E−01 | −9.4904E−02 | 0.0000E+00 | / |
| R12 | −8.1824E+00 | 7.8726E−01 | −8.8181E−01 | 3.5177E−01 | −5.2190E−02 | / |
| R13 | 2.3574E+00 | −7.0297E−01 | 1.2491E−01 | −2.2183E−03 | −1.4978E−03 | / |
| R14 | −6.8933E−01 | −3.8162E−01 | 1.1874E−01 | −1.9910E−02 | 1.3976E−03 | / |
| R15 | −1.1859E+00 | −1.0135E−01 | 1.6640E−02 | −1.3890E−03 | 4.1866E−05 | / |
| R16 | −3.8095E+00 | −9.6321E−04 | 1.7061E−04 | −1.5243E−05 | 5.6085E−07 | / |

Table 9 shows data of free-form surfaces in the camera optical lens 30 according to the third embodiment of the present disclosure.

above conditional expressions. Apparently, the camera optical lens in this embodiment satisfies the above conditional expressions.

TABLE 9

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R5 | −1.7387E+00 | 4.9993E−02 | 9.8097E−02 | 4.8783E−02 | 2.2121E−02 | 7.5356E−02 | 8.8475E−02 | 3.3777E−02 |
| R6 | −1.0000E+01 | −1.5147E−01 | −3.0329E−01 | −1.5160E−01 | −1.8173E−01 | −5.4966E−01 | −5.4599E−01 | −1.7952E−01 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R5 | −1.5502E−02 | −9.4427E−02 | −1.3853E−01 | −1.4352E−01 | −4.9336E−02 | 3.9154E−02 | 3.3209E−01 | 2.5271E−01 |
| R6 | 5.6705E−01 | 2.3259E+00 | 3.4261E+00 | 2.2658E+00 | 5.5956E−01 | −1.0494E+00 | −5.3847E+00 | −1.0448E+01 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R5 | 3.9219E−01 | 1.7863E−01 | 4.8570E−02 | −2.5844E−02 | −3.9123E−01 | 1.3959E−01 | 1.3213E−01 | 5.2618E−01 |
| R6 | −1.0663E+01 | −5.2596E+00 | −1.0464E+00 | 1.7775E+00 | 1.0702E+01 | 2.6334E+01 | 3.5841E+01 | 2.6840E+01 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R5 | 4.5336E−01 | 8.1410E−02 | −9.2926E−02 | −5.1021E−01 | −2.5380E+00 | −3.9380E+00 | −5.0676E+00 | −3.4586E+00 |
| R6 | 1.0837E+01 | 1.8033E+00 | −1.2082E+00 | −8.3810E+00 | −2.4956E+01 | −4.2441E+01 | −4.2579E+01 | −2.5417E+01 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R5 | −1.5398E+00 | −2.2132E−01 | 0.0000E+00 | 0.0000E+00 | 0.0000E+00 | 0.0000E+00 | 0.0000E+00 | 0.0000E+00 |
| R6 | −8.7359E+00 | −1.2394E+00 | 0.0000E+00 | 0.0000E+00 | 0.0000E+00 | 0.0000E+00 | 0.0000E+00 | 0.0000E+00 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R5 | 0.0000E+00 | 0.0000E+00 | 0.0000E+00 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 | 0.0000E+00 | 0.0000E+00 | 0.0000E+00 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R5 | 0.0000E+00 | 0.0000E+00 | 0.0000E+00 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 | 0.0000E+00 | 0.0000E+00 | 0.0000E+00 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R5 | 0.0000E+00 | 0.0000E+00 | 0.0000E+00 | 0.0000E+00 | 0.0000E+00 | 0.0000E+00 | 0.0000E+00 | 0.0000E+00 |
| R6 | 0.0000E+00 | 0.0000E+00 | 0.0000E+00 | 0.0000E+00 | 0.0000E+00 | 0.0000E+00 | 0.0000E+00 | 0.0000E+00 |

Figure 6:
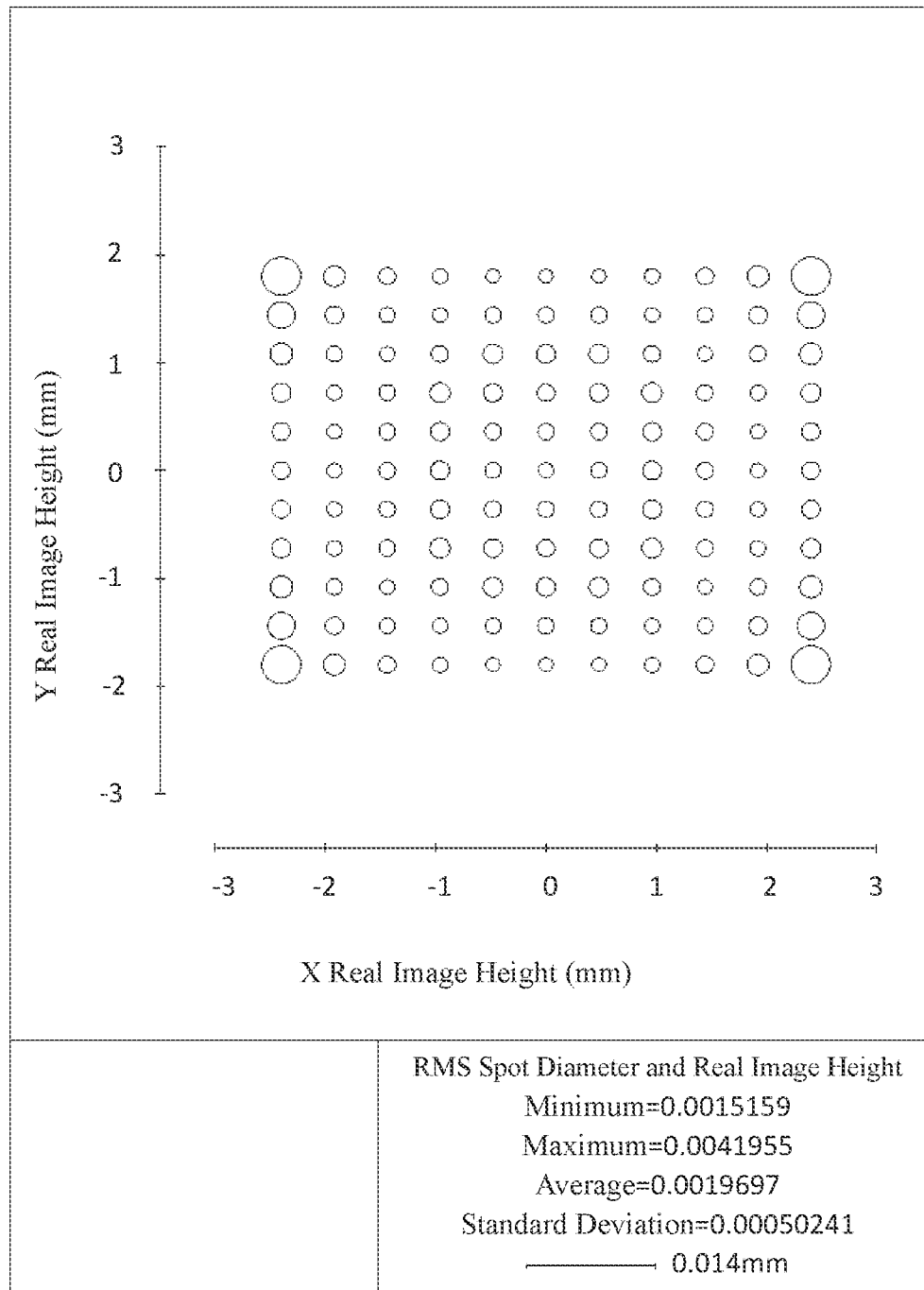
FIG. 6 shows a case where an RMS spot diameter of the camera optical lens shown in FIG. 5 is in a first quadrant.
Figure 7:
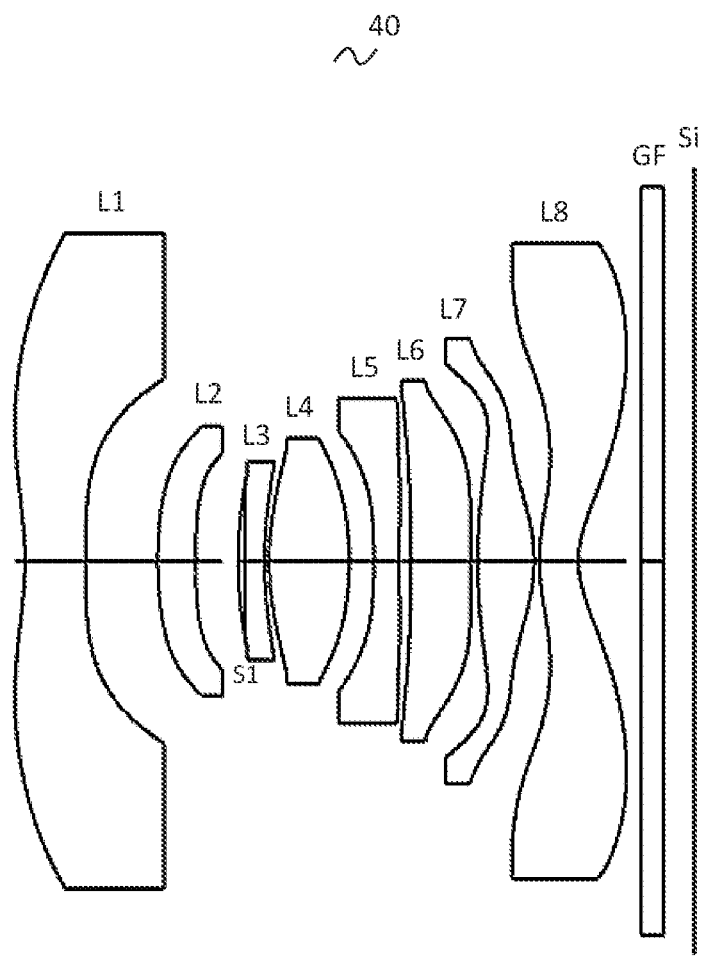
FIG. 7 is a schematic structural diagram of a camera optical lens according to a fourth embodiment of the present disclosure.

FIG. 6 shows a case where an RMS spot diameter of the camera optical lens 30 according to the third embodiment is in a first quadrant. It can be known according to FIG. 6 that the camera optical lens 30 according to the third embodiment can achieve good imaging quality.

Table 19 below lists values corresponding to the conditional expressions in this embodiment according to the In this embodiment, the camera optical lens 30 has an entrance pupil diameter ENPD of 1.000 mm, a full field image height (in a diagonal direction) IH of 6.000 mm, an image height of 4.800 mm in an x direction, and an image height of 3.600 mm in a y direction. Within the rectangular rang, the imaging effect is optimal. A field of view FOV is 120.00° in a diagonal direction, a field of view angle is 107.34° in the x direction, and a field-of-view angle is 90.87° in the y direction. The camera optical lens 30 meets design requirements of a wide angle, ultra-thinness, and a large aperture, has fully corrected on-axis and off-axis chromatic aberration, and has excellent optical characteristics.

Fourth Embodiment

The fourth embodiment is basically the same as the first embodiment. Symbols have the same meanings as those in the first embodiment. Only differences will be listed below.

In this embodiment, the image side surface of the first lens L1 is a convex surface at the paraxial position. The third lens L3 has negative refractive power, and the image side surface of the third lens L3 is a concave surface at the paraxial position.

Table 10, Table 11 and Table 12 show design data of the camera optical lens 40 according to the fourth embodiment of the present disclosure. The object side surface and the image side surface of the eighth lens L8 are free-form surfaces.

TABLE 10

|     | R       | d          | nd   |        | vd  |       |
|-----|---------|------------|------|--------|-----|-------|
| S1  | ∞       | d0= −2.105 |      |        |     |       |
| R1  | −2.113  | d1= 0.584  | nd1  | 1.5444 | v1  | 56.43 |
| R2  | −83.333 | d2= 0.686  |      |        |     |       |
| R3  | 2.993   | d3= 0.361  | nd2  | 1.6501 | v2  | 21.44 |
| R4  | 4.744   | d4= 0.411  |      |        |     |       |
| R5  | 3.869   | d5= 0.250  | nd3  | 1.5444 | v3  | 56.43 |
| R6  | 2.552   | d6= 0.041  |      |        |     |       |
| R7  | 1.776   | d7= 0.769  | nd4  | 1.5444 | v4  | 56.43 |
| R8  | −2.185  | d8= 0.230  |      |        |     |       |
| R9  | −7.795  | d9= 0.240  | nd5  | 1.6800 | v5  | 18.40 |
| R10 | 5.907   | d10= 0.115 |      |        |     |       |
| R11 | −11.611 | d11= 0.570 | nd6  | 1.5444 | v6  | 56.43 |
| R12 | 31.717  | d12= 0.073 |      |        |     |       |
| R13 | 6.447   | d13= 0.538 | nd7  | 1.5444 | v7  | 56.43 |
| R14 | −1.016  | d14= 0.048 |      |        |     |       |
| R15 | 1.304   | d15= 0.373 | nd8  | 1.5661 | v8  | 37.70 |
| R16 | 0.600   | d16= 0.600 |      |        |     |       |
| R17 | ∞       | d17= 0.215 | ndg  | 1.5168 | vg  | 64.17 |
| R18 | ∞       | d18= 0.296 |      |        |     |       |

Table 11 shows aspheric data of respective lenses in the camera optical lens 40 according to the fourth embodiment of the present disclosure.

TABLE 11

|     | Conic coefficient | Aspheric coefficient | | | | |
|-----|---|---|---|---|---|---|
|     | k | A4 | A6 | A8 | A10 | A12 |
| R1  | −1.6448E+01 | 8.9150E−02  | −4.4541E−02 | 1.8039E−02  | −5.4163E−03 | 1.1446E−03  |
| R2  | −5.0000E+01 | 3.2068E−01  | −3.3229E−01 | 5.2647E−01  | −7.0077E−01 | 6.7702E−01  |
| R3  | 4.0088E+00  | 1.0515E−01  | −6.7827E−02 | 4.3391E−01  | −1.3413E+00 | 2.9845E+00  |
| R4  | 1.1827E+00  | 1.8623E−01  | 8.9191E−02  | −1.0402E−01 | 1.1798E+00  | −3.0915E+00 |
| R5  | 2.1430E+00  | 7.8963E−02  | 1.6583E−01  | −9.0579E−01 | 2.9694E+00  | −5.5460E+00 |
| R6  | 3.4299E+00  | −2.5666E−01 | 7.0948E−01  | −1.9602E+00 | 3.8495E+00  | −4.9114E+00 |
| R7  | 4.5080E−01  | −2.6206E−01 | 5.7599E−01  | −1.3434E+00 | 2.0212E+00  | −1.5694E+00 |
| R8  | 1.6976E−01  | −1.1717E−01 | −4.8621E−03 | 4.0862E−01  | −1.1261E+00 | 1.5820E+00  |
| R9  | 4.7485E+01  | −4.0687E−01 | 1.5731E−01  | 4.0411E−01  | −6.5239E−01 | 2.0526E−01  |
| R10 | 9.1510E+00  | −2.0353E−01 | −1.2007E−01 | 9.2482E−01  | −1.5693E+00 | 1.4314E+00  |
| R11 | 4.8682E+01  | 9.8439E−02  | −4.4812E−01 | 9.5741E−01  | −1.1367E+00 | 7.6471E−01  |
| R12 | 4.9825E+01  | −1.3832E−02 | −3.6185E−01 | 2.1162E−01  | 1.6804E−01  | −2.7502E−01 |
| R13 | −8.5533E+00 | 2.0466E−01  | −4.7174E−01 | 6.2035E−01  | −5.7928E−01 | 3.8054E−01  |
| R14 | −7.0275E−01 | 5.2597E−01  | −7.0473E−01 | 1.3767E+00  | −1.6951E+00 | 1.2336E+00  |

|     | Conic coefficient | Aspheric coefficient | | | | |
|-----|---|---|---|---|---|---|
|     | k | A14 | A16 | A18 | A20 | / |
| R1  | −1.6448E+01 | −1.6303E−04 | 1.4843E−05  | −7.8076E−07 | 1.8082E−08  | / |
| R2  | −5.0000E+01 | −4.3385E−01 | 1.7178E−01  | −3.7551E−02 | 3.4208E−03  | / |
| R3  | 4.0088E+00  | −4.3177E+00 | 3.7897E+00  | −1.8111E+00 | 3.5375E−01  | / |
| R4  | 1.1827E+00  | 3.9262E+00  | −1.8818E+00 | 0.0000E+00  | 0.0000E+00  | / |
| R5  | 2.1430E+00  | 5.3440E+00  | −2.0995E+00 | 0.0000E+00  | 0.0000E+00  | / |
| R6  | 3.4299E+00  | 3.5982E+00  | −1.2197E+00 | 0.0000E+00  | 0.0000E+00  | / |
| R7  | 4.5080E−01  | −1.1536E−01 | 1.1327E+00  | −5.7662E−01 | 0.0000E+00  | / |
| R8  | 1.6976E−01  | −1.2077E+00 | 4.1137E−01  | 0.0000E+00  | 0.0000E+00  | / |
| R9  | 4.7485E+01  | 2.9870E−01  | −2.9216E−01 | 8.0008E−02  | 0.0000E+00  | / |
| R10 | 9.1510E+00  | −7.5061E−01 | 2.1213E−01  | −2.5326E−02 | 0.0000E+00  | / |
| R11 | 4.8682E+01  | −2.8331E−01 | 5.3830E−02  | −4.3638E−03 | 0.0000E+00  | / |
| R12 | 4.9825E+01  | 1.4461E−01  | −3.4070E−02 | 3.0130E−03  | 0.0000E+00  | / |
| R13 | −8.5533E+00 | −1.9414E−01 | 7.1958E−02  | −1.5887E−02 | 1.5038E−03  | / |
| R14 | −7.0275E−01 | −5.5551E−01 | 1.5356E−01  | −2.3850E−02 | 1.5894E−03  | / |

Table 12 shows data of free-form surfaces in the camera optical lens 40 according to the fourth embodiment of the present disclosure.

In this embodiment, the image side surface of the first lens L1 is a convex surface at the paraxial position. The third lens L3 has negative refractive power, and the image side surface of the third lens L3 is a concave surface at the paraxial position.

TABLE 12

| | | | | Free-form surface coefficient | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R15 | −1.3162E+00 | −4.5639E−01 | −9.1337E−01 | −4.5596E−01 | 2.2973E−01 | 6.9048E−01 | 6.8926E−01 | 2.2926E−01 |
| R16 | −3.0174E+00 | −2.2015E−01 | −4.4053E−01 | −2.1981E−01 | 1.6893E−01 | 5.0778E−01 | 5.0645E−01 | 1.6893E−01 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R15 | −2.0632E−02 | −8.2961E−02 | −1.2443E−01 | −8.2306E−02 | −2.0510E−02 | −4.8159E−02 | −2.4085E−01 | −4.8147E−01 |
| R16 | −8.9928E−02 | −3.6027E−01 | −5.3992E−01 | −3.5967E−01 | −9.0086E−02 | 3.2614E−02 | 1.6314E−01 | 3.2639E−01 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R15 | −4.8167E−01 | −2.4091E−01 | −4.8136E−02 | 3.1437E−02 | 1.8863E−01 | 4.7157E−01 | 6.2883E−01 | 4.7146E−01 |
| R16 | 3.2607E−01 | 1.6316E−01 | 3.2672E−02 | −7.9164E−03 | −4.7482E−02 | −1.1876E−01 | −1.5828E−01 | −1.1872E−01 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R15 | 1.8865E−01 | 3.1433E−02 | −9.4195E−03 | −6.5931E−02 | −1.9781E−01 | −3.2966E−01 | −3.2970E−01 | −1.9778E−01 |
| R16 | −4.7532E−02 | −7.9125E−03 | 1.2487E−03 | 8.7403E−03 | 2.6222E−02 | 4.3690E−02 | 4.3703E−02 | 2.6227E−02 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R15 | −6.5946E−02 | −9.4125E−03 | 1.5506E−03 | 1.2407E−02 | 4.3420E−02 | 8.6848E−02 | 1.0854E−01 | 8.6857E−02 |
| R16 | 8.7332E−03 | 1.2459E−03 | −1.2194E−04 | −9.7632E−04 | −3.4159E−03 | −6.8291E−03 | −8.5393E−03 | −6.8297E−03 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R15 | 4.3443E−02 | 1.2388E−02 | 1.5384E−03 | −1.3595E−04 | −1.2237E−03 | −4.8964E−03 | −1.1421E−02 | −1.7143E−02 |
| R16 | −3.4184E−03 | −9.7295E−04 | −1.2232E−04 | 6.6862E−06 | 6.0108E−05 | 2.4038E−04 | 5.6130E−04 | 8.4131E−04 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R15 | −1.7136E−02 | −1.1407E−02 | −4.8998E−03 | −1.2180E−03 | −1.3262E−04 | 4.9903E−06 | 4.9836E−05 | 2.2448E−04 |
| R16 | 8.4076E−04 | 5.6162E−04 | 2.4013E−04 | 6.1588E−05 | 6.6849E−06 | −1.5861E−07 | −1.5577E−06 | −7.0295E−06 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R15 | 6.0062E−04 | 1.0469E−03 | 1.2562E−03 | 1.0521E−03 | 6.0275E−04 | 2.1006E−04 | 5.5304E−05 | 4.7273E−06 |
| R16 | −1.8763E−05 | −3.2949E−05 | −3.9426E−05 | −3.2670E−05 | −1.8599E−05 | −7.3646E−06 | −1.7880E−06 | −1.4229E−07 |

Figure 8:
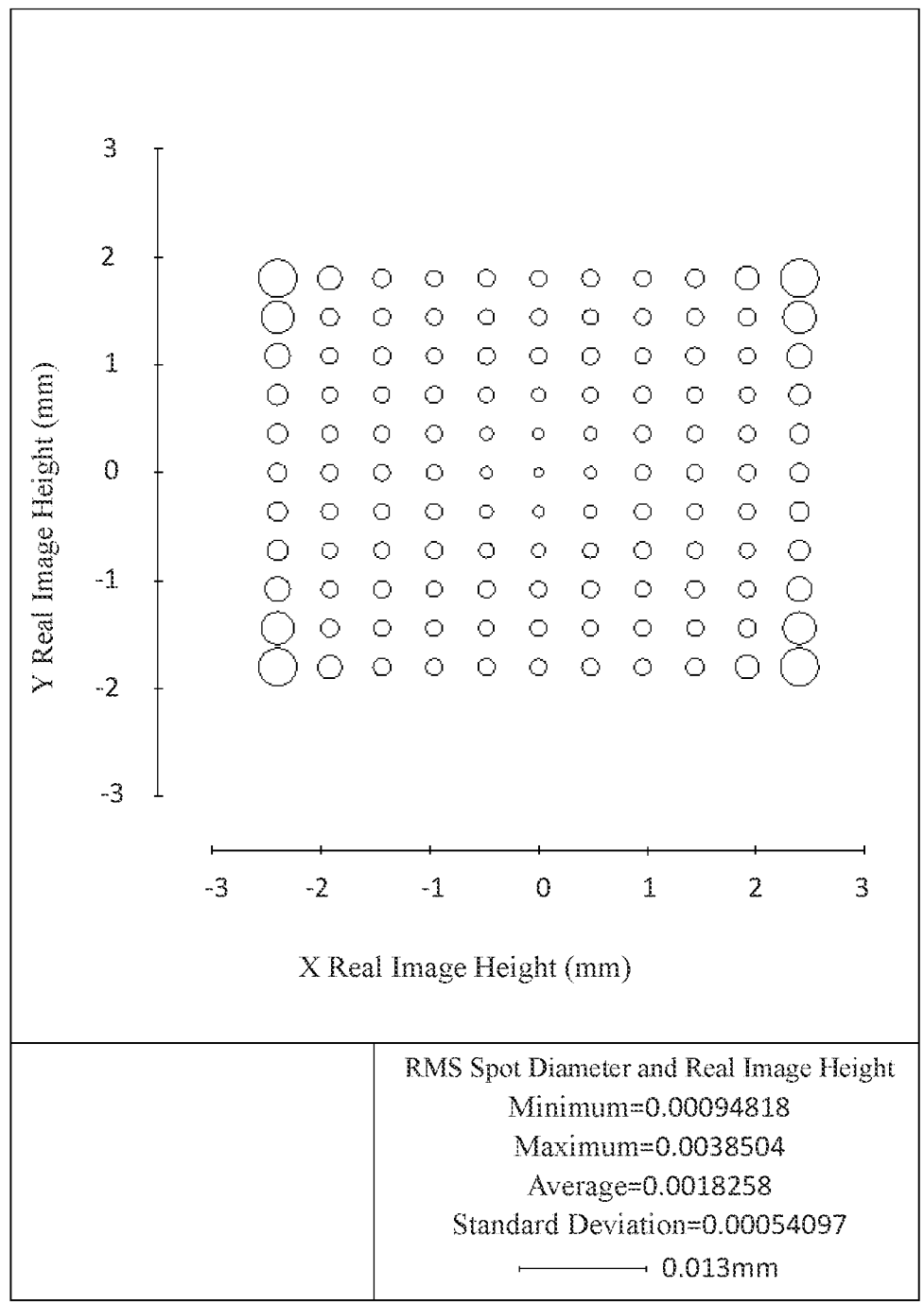
FIG. 8 shows a case where an RMS spot diameter of the camera optical lens shown in FIG. 7 is in a first quadrant.
Figure 9:
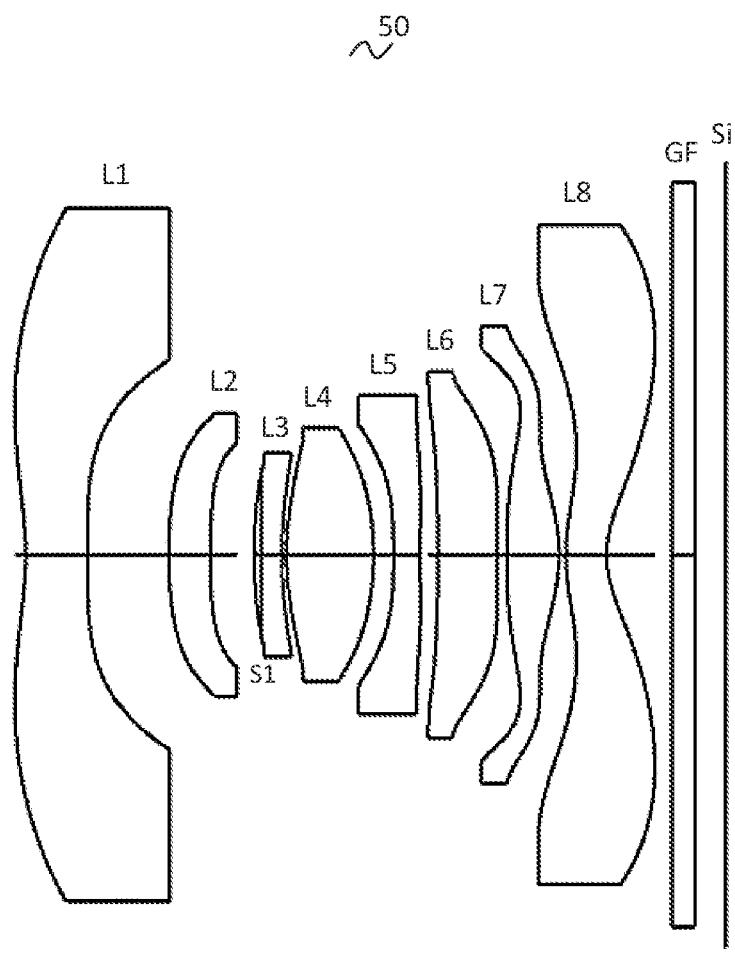
FIG. 9 is a schematic structural diagram of a camera optical lens according to a fifth embodiment of the present disclosure.

FIG. 8 shows a case where an RMS spot diameter of the camera optical lens 40 according to the fourth embodiment is in a first quadrant. It can be known according to FIG. 8 that the camera optical lens 40 according to the fourth embodiment can achieve good imaging quality.

Table 19 below lists values corresponding to the conditional expressions in this embodiment according to the above conditional expressions. Apparently, the camera optical lens in this embodiment satisfies the above conditional expressions.

In this embodiment, the camera optical lens 40 has an entrance pupil diameter ENPD of 1.000 mm, a full field image height (in a diagonal direction) IH of 6.000 mm, an image height of 4.800 mm in an x direction, and an image height of 3.600 mm in a y direction. Within the rectangular rang, the imaging effect is optimal. A field of view FOV is 120.00° in a diagonal direction, a field of view is 106.39° in the x direction, and a field of view is 89.08° in the y direction. The camera optical lens 40 meets design requirements of a wide angle, ultra-thinness, and a large aperture, has fully corrected on-axis and off-axis chromatic aberration, and has excellent optical characteristics.

Fifth Embodiment

The fifth embodiment is basically the same as the first embodiment. Symbols have the same meaning as those in the first embodiment. Only differences will be listed below.

Table 13, Table 14 and Table 15 show design data of the camera optical lens 50 according to the fifth embodiment of the present disclosure. The object side surface and the image side surface of the first lens L1 are free-form surfaces.

TABLE 13

| | R | d | | nd | | vd | |
|---|---|---|---|---|---|---|---|
| S1 | ∞ | d0= | −2.153 | | | | |
| R1 | −2.139 | d1= | 0.566 | nd1 | 1.5444 | v1 | 56.43 |
| R2 | −58.824 | d2= | 0.742 | | | | |
| R3 | 3.247 | d3= | 0.380 | nd2 | 1.6501 | v2 | 21.44 |
| R4 | 6.046 | d4= | 0.403 | | | | |
| R5 | 4.042 | d5= | 0.252 | nd3 | 1.5444 | v3 | 56.43 |
| R6 | 2.645 | d6= | 0.040 | | | | |
| R7 | 1.854 | d7= | 0.796 | nd4 | 1.5444 | v4 | 56.43 |
| R8 | −2.103 | d8= | 0.182 | | | | |
| R9 | −6.301 | d9= | 0.240 | nd5 | 1.6800 | v5 | 18.40 |
| R10 | 7.910 | d10= | 0.167 | | | | |
| R11 | −8.974 | d11= | 0.540 | nd6 | 1.5444 | v6 | 56.43 |
| R12 | 107.493 | d12= | 0.086 | | | | |
| R13 | 7.117 | d13= | 0.481 | nd7 | 1.5444 | v7 | 56.43 |
| R14 | −1.033 | d14= | 0.061 | | | | |
| R15 | 1.326 | d15= | 0.372 | nd8 | 1.5661 | v8 | 37.70 |
| R16 | 0.601 | d16= | 0.600 | | | | |
| R17 | ∞ | d17= | 0.210 | ndg | 1.5168 | vg | 64.17 |
| R18 | ∞ | d18= | 0.282 | | | | |

Table 14 shows aspheric data of respective lenses in the camera optical lens 50 according to the fifth embodiment of the present disclosure.

TABLE 14

| | Conic coefficient | Aspheric coefficient | | | | |
|---|---|---|---|---|---|---|
| | k | A4 | A6 | A8 | A10 | A12 |
| R3 | 4.9229E+00 | 1.0411E−01 | −1.1585E−01 | 8.2105E−01 | −2.7358E+00 | 5.9978E+00 |
| R4 | 1.0448E+01 | 1.8493E−01 | 6.7181E−02 | 6.7975E−02 | 6.7525E−01 | −2.2503E+00 |
| R5 | 3.5763E+00 | 9.4402E−02 | 3.6628E−03 | 4.2244E−02 | −7.3208E−02 | 0.0000E+00 |
| R6 | 3.7405E+00 | −2.1355E−01 | 4.2829E−01 | −8.5946E−01 | 1.0498E+00 | −5.7072E−01 |
| R7 | 5.1028E−01 | −2.2120E−01 | 3.9020E−01 | −8.6665E−01 | 1.3906E+00 | −1.6852E+00 |
| R8 | 6.8265E−01 | −1.6285E−01 | 1.1047E−01 | 2.0211E−01 | −8.5557E−01 | 1.2815E+00 |
| R9 | 3.1013E+01 | −4.7211E−01 | 2.9841E−01 | 3.0999E−01 | −8.9445E−01 | 8.7169E−01 |
| R10 | 1.3727E+01 | −2.3623E−01 | 6.5064E−02 | 5.4942E−01 | −1.2279E+00 | 1.3516E+00 |
| R11 | 4.2904E+01 | 8.5434E−02 | −2.4786E−01 | 4.2096E−01 | −3.9763E−01 | 1.5011E−01 |
| R12 | 5.0000E+01 | −2.8944E−03 | −3.3350E−01 | 6.5750E−02 | 3.7050E−01 | −3.8478E−01 |
| R13 | 9.9959E+00 | 2.2591E−01 | −3.5771E−01 | 2.3645E−01 | 1.1534E−01 | −4.1193E−01 |
| R14 | −6.9721E−01 | 5.7150E−01 | −7.6191E−01 | 1.6149E+00 | −2.1033E+00 | 1.5719E+00 |
| R15 | −1.1590E+00 | −4.6406E−01 | 1.7690E−01 | 7.2990E−02 | −1.2376E−01 | 6.7390E−02 |
| R16 | −2.9881E+00 | −2.3704E−01 | 1.8642E−01 | −1.0108E−01 | 3.7560E−02 | −9.5256E−03 |

| | Conic coefficient | Aspheric coefficient | | | | |
|---|---|---|---|---|---|---|
| | k | A14 | A16 | A18 | A20 | / |
| R3 | 4.9229E+00 | −8.3077E+00 | 6.9714E+00 | −3.2117E+00 | 6.1440E−01 | / |
| R4 | 1.0448E+01 | 3.3259E+00 | −1.7668E+00 | 0.0000E+00 | 0.0000E+00 | / |
| R5 | 3.5763E+00 | 0.0000E+00 | 0.0000E+00 | 0.0000E+00 | 0.0000E+00 | / |
| R6 | 3.7405E+00 | 0.0000E+00 | 0.0000E+00 | 0.0000E+00 | 0.0000E+00 | / |
| R7 | 5.1028E−01 | 1.3282E+00 | −4.6802E−01 | 0.0000E+00 | 0.0000E+00 | / |
| R8 | 6.8265E−01 | −9.8121E−01 | 3.3915E−01 | 0.0000E+00 | 0.0000E+00 | / |
| R9 | 3.1013E+01 | −3.6778E−01 | 4.6609E−02 | 0.0000E+00 | 0.0000E+00 | / |
| R10 | 1.3727E+01 | −8.3101E−01 | 2.7072E−01 | −3.6846E−02 | 0.0000E+00 | / |
| R11 | 4.2904E+01 | 3.0702E−02 | −3.6732E−02 | 7.0834E−03 | 0.0000E+00 | / |
| R12 | 5.0000E+01 | 1.5088E−01 | −1.9615E−02 | −6.1314E−04 | 0.0000E+00 | / |
| R13 | 9.9959E+00 | 3.6323E−01 | −1.5949E−01 | 3.5814E−02 | −3.2658E−03 | / |
| R14 | −6.9721E−01 | −7.0833E−01 | 1.9167E−01 | −2.8707E−02 | 1.8298E−03 | / |
| R15 | −1.1590E+00 | −2.0052E−02 | 3.4677E−03 | −3.2845E−04 | 1.3229E−05 | / |
| R16 | −2.9881E+00 | 1.6126E−03 | −1.7403E−04 | 1.0820E−05 | −2.9478E−07 | / |

Table 15 shows data of free-form surface in the camera optical lens 50 according to the fifth embodiment of the present disclosure.

TABLE 15

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −1.6564E+01 | 8.2014E−02 | 1.6432E−01 | 8.2141E−02 | −3.8824E−02 | −1.1661E−01 | −1.1664E−01 | −3.8912E−02 |
| R2 | 5.0000E+01 | 2.9280E−01 | 5.8694E−01 | 2.9311E−01 | −2.7350E−01 | −8.2212E−01 | −8.2264E−01 | −2.7371E−01 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R1 | 1.4884E−02 | 5.9547E−02 | 8.9357E−02 | 5.9554E−02 | 1.4909E−02 | −4.2218E−03 | −2.1106E−02 | −4.2215E−02 |
| R2 | 3.6997E−01 | 1.4815E+00 | 2.2192E+00 | 1.4834E+00 | 3.6996E−01 | −4.1059E−01 | −2.0544E+00 | −4.1019E+00 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R1 | −4.2219E−02 | −2.1098E−02 | −4.2219E−03 | 8.4230E−04 | 5.0534E−03 | 1.2633E−02 | 1.6840E−02 | 1.2639E−02 |
| R2 | −4.1062E+00 | −2.0565E+00 | −4.1058E−01 | 3.3208E−01 | 1.9928E+00 | 4.9784E+00 | 6.6446E+00 | 4.9791E+00 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R1 | 5.0493E−03 | 8.4161E−04 | −1.1366E−04 | −7.9566E−04 | −2.3870E−03 | −3.9791E−03 | −3.9779E−03 | −2.3877E−03 |
| R2 | 1.9940E+00 | 3.3214E−01 | −1.7667E−01 | −1.2362E+00 | −3.7097E+00 | −6.1847E+00 | −6.1880E+00 | −3.7042E+00 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R1 | −7.9666E−04 | −1.1370E−04 | 9.8772E−06 | 7.9009E−05 | 2.7656E−04 | 5.5322E−04 | 6.9149E−04 | 5.5321E−04 |
| R2 | −1.2366E+00 | −1.7664E−01 | 5.6727E−02 | 4.5353E−01 | 1.5884E+00 | 3.1745E+00 | 3.9714E+00 | 3.1751E+00 |

TABLE 15-continued

| | | | | Free-form surface coefficient | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R1 | 2.7625E−04 | 7.9286E−05 | 9.8938E−06 | −4.9987E−07 | −4.4965E−06 | −1.7983E−05 | −4.1912E−05 | −6.2907E−05 |
| R2 | 1.5884E+00 | 4.5333E−01 | 5.6686E−02 | −9.6777E−03 | −8.7247E−02 | −3.4799E−01 | −8.1339E−01 | −1.2174E+00 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R1 | −6.2935E−05 | −4.1917E−05 | −1.7952E−05 | −4.3823E−06 | −5.0218E−07 | 1.1205E−08 | 1.1210E−07 | 5.0262E−07 |
| R2 | −1.2154E+00 | −8.1678E−01 | −3.5108E−01 | −8.7081E−02 | −9.6767E−03 | 6.4101E−04 | 6.4897E−03 | 2.8766E−02 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R1 | 1.3384E−06 | 2.3370E−06 | 2.8141E−06 | 2.3381E−06 | 1.3454E−06 | 4.9988E−07 | 9.0125E−08 | 1.1724E−08 |
| R2 | 7.7235E−02 | 1.3579E−01 | 1.5918E−01 | 1.3505E−01 | 7.9469E−02 | 2.9678E−02 | 6.4998E−03 | 6.4196E−04 |

Figure 10:
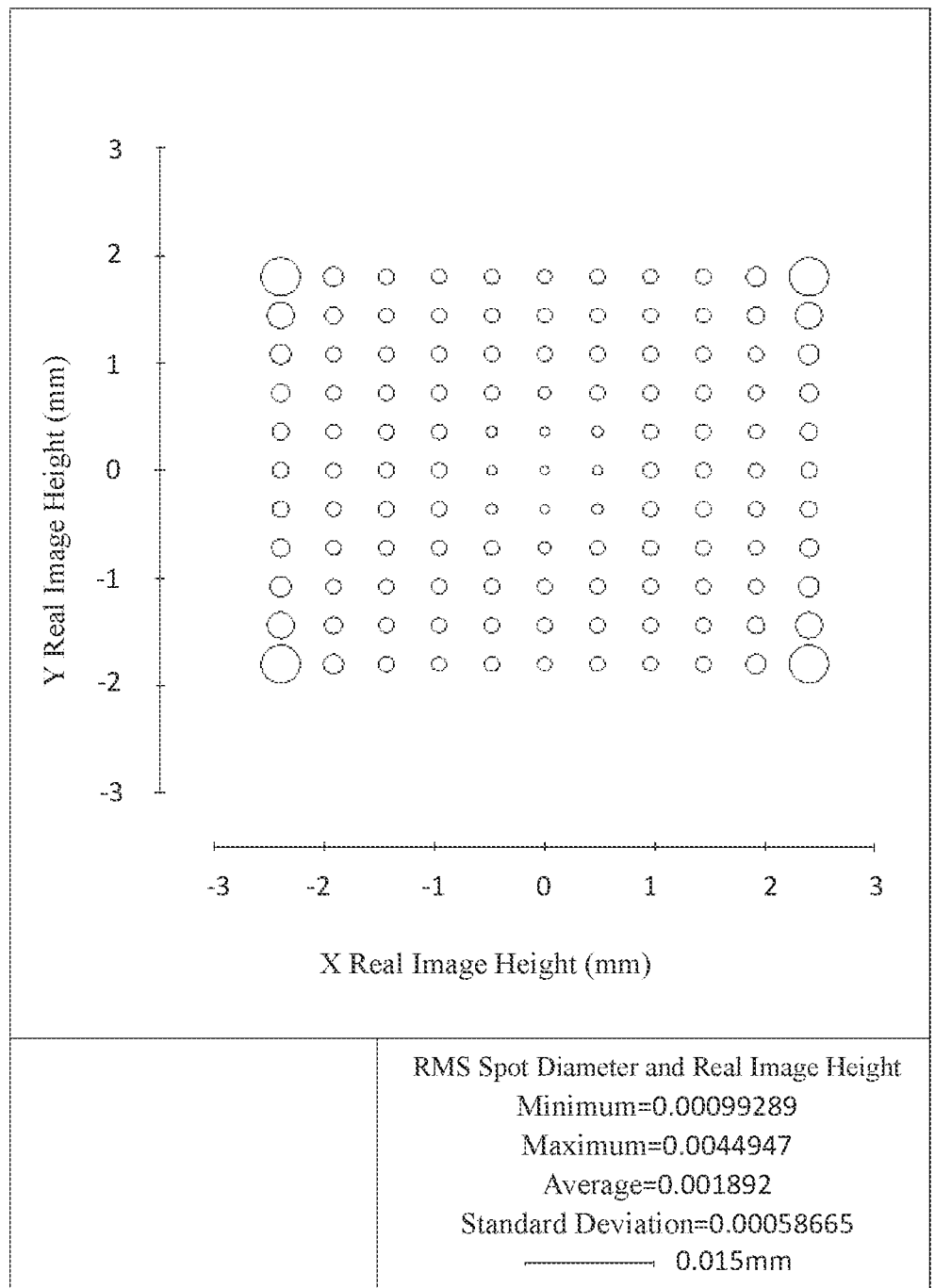
FIG. 10 shows a case where an RMS spot diameter of the camera optical lens shown in FIG. 9 is in a first quadrant.
Figure 11:
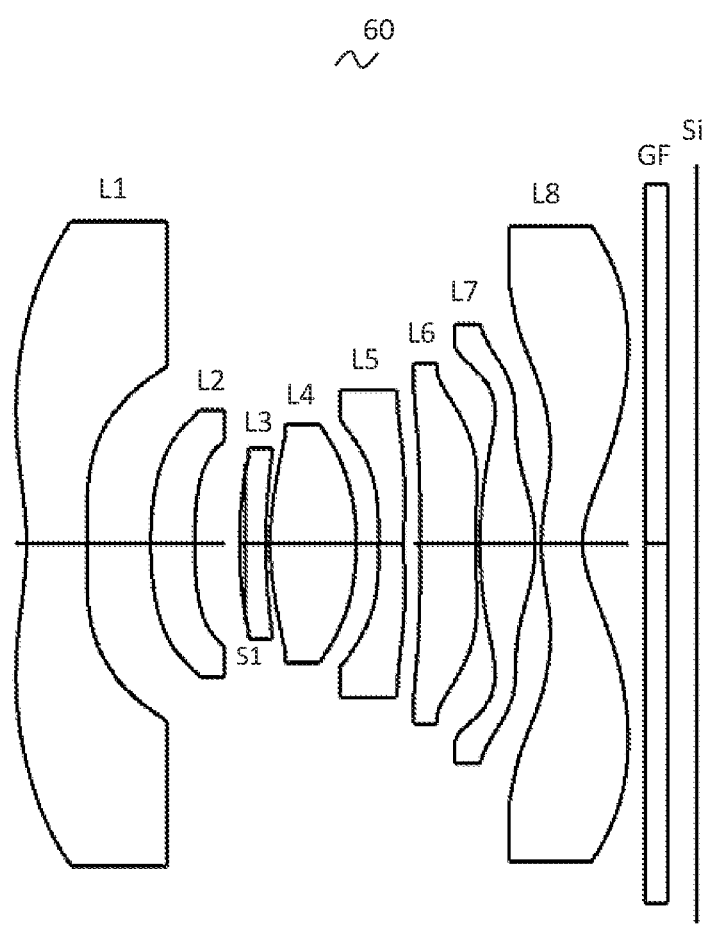
FIG. 11 is a schematic structural diagram of a camera optical lens according to a sixth embodiment of the present disclosure.

FIG. 10 shows a case where an RMS spot diameter of the camera optical lens 50 according to the fifth embodiment is in a first quadrant. It can be known according to FIG. 10 that the camera optical lens 50 according to the fifth embodiment can achieve good imaging quality.

Table 19 below lists values corresponding to the conditional expressions in this embodiment according to the above conditional expressions. Apparently, the camera optical lens in this embodiment satisfies the above conditional expressions.

In this embodiment, the camera optical lens 50 has an entrance pupil diameter ENPD of 1.000 mm, a full field image height (in a diagonal direction) IH of 6.000 mm, an image height of 4.800 mm in an x direction, and an image height of 3.600 mm in a y direction. Within the rectangular rang, the imaging effect is optimal. A field of view FOV is 120.00° in the diagonal direction, a field of view angle is 107.01° in the x direction, and a field-of-view angle is 89.40° in the y direction. The camera optical lens 50 meets design requirements of a wide angle, ultra-thinness, and a large aperture, has fully corrected on-axis and off-axis chromatic aberration, and has excellent optical characteristics.

Sixth Embodiment

The sixth embodiment is basically the same as the first embodiment. Symbols have the same meanings as those in the first embodiment. Only differences will be listed below.

In this embodiment, the image side surface of the first lens L1 is a convex surface at the paraxial position. The third lens L3 has negative refractive power, and the image side surface of the third lens L3 is a concave surface at the paraxial position.

Table 16, Table 17 and Table 18 show design data of the camera optical lens 60 according to the sixth embodiment of the present disclosure. The object side surface and the image side surface of the second lens L2 are free-form surfaces.

TABLE 16

| | R | d | nd | | vd | |
|---|---|---|---|---|---|---|
| S1 | ∞ | d0= −2.093 | | | | |
| R1 | −2.009 | d1= 0.578 | nd1 | 1.5444 | v1 | 56.43 |
| R2 | −28.571 | d2= 0.609 | | | | |
| R3 | 2.826 | d3= 0.420 | nd2 | 1.6501 | v2 | 21.44 |
| R4 | 3.833 | d4= 0.432 | | | | |
| R5 | 4.276 | d5= 0.250 | nd3 | 1.5444 | v3 | 56.43 |
| R6 | 3.548 | d6= 0.040 | | | | |
| R7 | 2.040 | d7= 0.825 | nd4 | 1.5444 | v4 | 56.43 |
| R8 | −1.994 | d8= 0.211 | | | | |
| R9 | −7.105 | d9= 0.240 | nd5 | 1.6800 | v5 | 18.40 |
| R10 | 7.164 | d10= 0.161 | | | | |
| R11 | −9.416 | d11= 0.529 | nd6 | 1.5444 | v6 | 56.43 |
| R12 | 14.458 | d12= 0.040 | | | | |
| R13 | 5.725 | d13= 0.529 | nd7 | 1.5444 | v7 | 56.43 |
| R14 | −1.030 | d14= 0.055 | | | | |
| R15 | 1.379 | d15= 0.394 | nd8 | 1.5661 | v8 | 37.70 |
| R16 | 0.614 | d16= 0.600 | | | | |
| R17 | ∞ | d17= 0.210 | ndg | 1.5168 | vg | 64.17 |
| R18 | ∞ | d18= 0.275 | | | | |

Table 17 shows aspheric data of respective lenses in the camera optical lens 60 according to the sixth embodiment of the present disclosure.

TABLE 17

| | Conic coefficient | Aspheric coefficient | | | | |
|---|---|---|---|---|---|---|
| | k | A4 | A6 | A8 | A10 | A12 |
| R1 | −1.5874E+01 | 9.1716E−02 | −4.6930E−02 | 1.9205E−02 | −5.7858E−03 | 1.2268E−03 |
| R2 | 5.0000E+01 | 3.5058E−01 | −3.7736E−01 | 5.7189E−01 | −7.1054E−01 | 6.3770E−01 |
| R5 | 1.0131E+00 | 7.6501E−02 | 1.5023E−01 | −7.8962E−01 | 2.6046E+00 | −4.6685E+00 |
| R6 | 7.0726E+00 | −1.8982E−01 | 4.4718E−01 | −1.1202E+00 | 1.8625E+00 | −1.5240E+00 |
| R7 | 1.0246E+00 | −2.0673E−01 | 4.0799E−01 | −1.1107E+00 | 2.1926E+00 | −3.1257E+00 |
| R8 | 6.7149E−01 | −1.4287E−01 | 4.2591E−02 | 2.2038E−01 | −6.3614E−01 | 8.2163E−01 |
| R9 | 3.9939E+01 | −4.6159E−01 | 1.3570E−01 | 3.1037E−01 | −2.3216E−01 | −4.3513E−01 |
| R10 | −9.9645E−01 | −2.2453E−01 | −3.6331E−02 | 5.8407E−01 | −9.8935E−01 | 9.1718E−01 |
| R11 | 4.3062E+01 | 1.0730E−01 | −2.5285E−01 | 3.6660E−01 | −3.0617E−01 | 1.0863E−01 |
| R12 | 2.8752E+01 | 1.5269E−01 | −7.6309E−01 | 5.8779E−01 | 1.8375E−02 | −2.5687E−01 |

TABLE 17-continued

| | | | | | | |
|---|---|---|---|---|---|---|
| R13 | 6.9630E+00 | 3.6949E−01 | −8.5440E−01 | 1.0066E+00 | −6.2740E−01 | 6.6104E−02 |
| R14 | −7.0083E−01 | 5.4052E−01 | −7.7259E−01 | 1.7298E+00 | −2.2734E+00 | 1.7030E+00 |
| R15 | −1.0350E+00 | −4.3863E−01 | 4.3981E−02 | 3.0110E−01 | −3.2540E−01 | 1.6999E−01 |
| R16 | −2.9288E+00 | −2.6040E−01 | 2.1587E−01 | −1.1904E−01 | 4.3981E−02 | −1.0960E−02 |

| | Conic coefficient | Aspheric coefficient | | | | |
|---|---|---|---|---|---|---|
| | k | A14 | A16 | A18 | A20 | / |
| R1 | −1.5874E+01 | −1.7613E−04 | 1.6272E−05 | −8.7285E−07 | 2.0659E−08 | / |
| R2 | 5.0000E+01 | −3.7887E−01 | 1.3858E−01 | −2.7919E−02 | 2.3421E−03 | / |
| R5 | 1.0131E+00 | 4.1390E+00 | −1.4603E+00 | 0.0000E+00 | 0.0000E+00 | / |
| R6 | 7.0726E+00 | 3.2742E−01 | 7.9337E−02 | 0.0000E+00 | 0.0000E+00 | / |
| R7 | 1.0246E+00 | 2.9827E+00 | −1.6219E+00 | 3.6494E−01 | 0.0000E+00 | / |
| R8 | 6.7149E−01 | −5.6024E−01 | 1.8744E−01 | 0.0000E+00 | 0.0000E+00 | / |
| R9 | 3.9939E+01 | 9.0710E−01 | −6.0650E−01 | 1.4201E−01 | 0.0000E+00 | / |
| R10 | −9.9645E−01 | −4.8866E−01 | 1.3803E−01 | −1.6132E−02 | 0.0000E+00 | / |
| R11 | 4.3062E+01 | 1.5351E−02 | −2.0249E−02 | 3.7339E−03 | 0.0000E+00 | / |
| R12 | 2.8752E+01 | 1.3929E−01 | −2.7728E−02 | 1.4961E−03 | 0.0000E+00 | / |
| R13 | 6.9630E+00 | 1.5986E−01 | −1.0484E−01 | 2.7378E−02 | −2.6910E−03 | / |
| R14 | −7.0083E−01 | −7.6820E−01 | 2.0789E−01 | −3.1116E−02 | 1.9804E−03 | / |
| R15 | −1.0350E+00 | −5.1463E−02 | 9.2088E−03 | −9.0769E−04 | 3.8112E−05 | / |
| R16 | −2.9288E+00 | 1.8174E−03 | −1.9222E−04 | 1.1739E−05 | −3.1507E−07 | / |

Table 18 shows data of free-form surfaces in the camera optical lens 60 according to the sixth embodiment of the present disclosure.

TABLE 18

Free-form surface coefficient

| | k | $X^4Y^0$ | $X^2Y^2$ | $X^0Y^4$ | $X^6Y^0$ | $X^4Y^2$ | $X^2Y^4$ | $X^0Y^6$ |
|---|---|---|---|---|---|---|---|---|
| R3 | 3.9799E+00 | 1.2697E−01 | 2.5383E−01 | 1.2699E−01 | −2.8955E−01 | −8.6912E−01 | −8.6453E−01 | −2.8886E−01 |
| R4 | 1.2481E+01 | 1.6277E−01 | 3.2682E−01 | 1.6257E−01 | 1.2394E−01 | 3.5448E−01 | 3.6880E−01 | 1.2630E−01 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R3 | 1.5060E+00 | 6.0229E+00 | 9.0419E+00 | 5.9922E+00 | 1.5030E+00 | −4.6347E+00 | −2.3176E+01 | −4.6357E+01 |
| R4 | −4.6231E−01 | −1.7977E+00 | −2.5875E+00 | −1.9007E+00 | −4.7278E−01 | 2.9559E+00 | 1.4771E+01 | 2.9108E+01 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R3 | −4.6347E+01 | −2.3101E+01 | −4.6314E+00 | 9.3343E+00 | 5.6018E+01 | 1.4000E+02 | 1.8674E+02 | 1.4005E+02 |
| R4 | 2.9151E+01 | 1.5029E+01 | 2.9776E+00 | −7.3028E+00 | −4.3751E+01 | −1.1015E+02 | −1.4695E+02 | −1.0839E+02 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R3 | 5.5988E+01 | 9.3363E+00 | −1.1944E+01 | −8.3608E+01 | −2.5077E+02 | −4.1814E+02 | −4.1801E+02 | −2.5101E+02 |
| R4 | −4.3775E+01 | −7.2789E+00 | 9.1506E+00 | 6.3573E+01 | 1.9403E+02 | 3.2848E+02 | 3.2037E+02 | 1.8850E+02 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R3 | −8.3655E+01 | −1.1947E+01 | 9.3175E+00 | 7.4530E+01 | 2.6087E+02 | 5.2180E+02 | 6.5213E+02 | 5.2162E+02 |
| R4 | 6.2790E+01 | 9.0395E+00 | −4.4670E+00 | −3.5298E+01 | −1.2573E+02 | −2.5887E+02 | −3.1813E+02 | −2.4672E+02 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R3 | 2.6088E+02 | 7.4516E+01 | 9.3151E+00 | −4.0177E+00 | −3.6166E+01 | −1.4475E+02 | −3.3748E+02 | −5.0604E+02 |
| R4 | −1.2179E+02 | −3.4440E+01 | −4.3863E+00 | 0.0000E+00 | 0.0000E+00 | 0.0000E+00 | 0.0000E+00 | 0.0000E+00 |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R3 | −5.0618E+02 | −3.3709E+02 | −1.4432E+02 | −3.6100E+01 | −4.0157E+00 | 7.2551E−01 | 7.2624E+00 | 3.2736E+01 |
| R4 | 0.0000E+00 | 0.0000E+00 | 0.0000E+00 | 0.0000E+00 | 0.0000E+00 | 0.0000E+00 | 0.0000E+00 | 0.0000E+00 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R3 | 8.7076E+01 | 1.5226E+02 | 1.8281E+02 | 1.5236E+02 | 8.6769E+01 | 3.2476E+01 | 7.2404E+00 | 7.2546E−01 |
| R4 | 0.0000E+00 | 0.0000E+00 | 0.0000E+00 | 0.0000E+00 | 0.0000E+00 | 0.0000E+00 | 0.0000E+00 | 0.0000E+00 |

Figure 12:
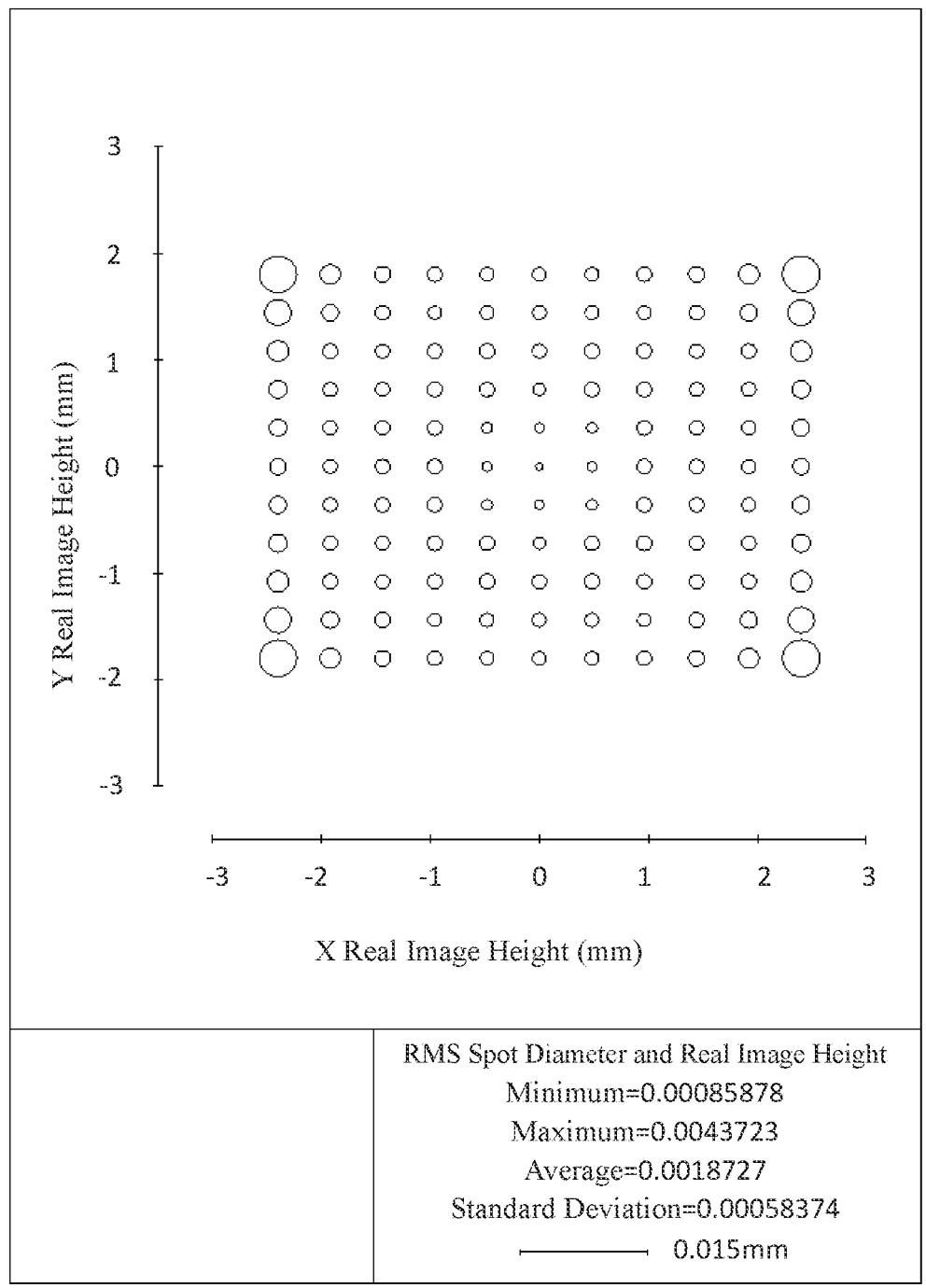
FIG. 12 shows a case where an RMS spot diameter of the camera optical lens shown in FIG. 11 is in a first quadrant.

FIG. 12 shows a case where an RMS spot diameter of the camera optical lens 60 according to the sixth embodiment is in a first quadrant. It can be known according to FIG. 12 that the camera optical lens 60 according to the sixth embodiment can achieve good imaging quality.

Table 19 below lists values corresponding to the conditional expressions in this embodiment according to the above conditional expressions. Apparently, the camera optical lens in this embodiment satisfies the above conditional expressions.

In this embodiment, the camera optical lens 60 has an entrance pupil diameter ENPD of 1.000 mm, a full field image height (in a diagonal direction) IH of 6.000 mm, an image height of 4.800 mm in an x direction, and an image height of 3.600 mm in a y direction. Within the rectangular rang, the imaging effect is optimal. A field of view FOV is 119.99° in the diagonal direction, a field of view in the x direction is 106.91°, and a field of view in the y direction is 89.51°. The camera optical lens 60 meets design requirements of a wide angle, ultra-thinness, and a large aperture, has fully corrected on-axis and off-axis chromatic aberration, and has excellent optical characteristics.

TABLE 19

| Parameters and conditional expressions | Embodiment 1 | Embodiment 2 | Embodiment 3 | Embodiment 4 | Embodiment 5 | Embodiment 6 |
|---|---|---|---|---|---|---|
| R15 | 1.702 | 1.543 | 1.630 | 1.304 | 1.326 | 1.379 |
| R16 | 0.674 | 0.641 | 0.665 | 0.600 | 0.601 | 0.614 |
| d8/d9 | 0.350 | 0.433 | 0.417 | 0.958 | 0.758 | 0.879 |
| f | 1.800 | 1.800 | 1.800 | 1.800 | 1.800 | 1.800 |
| f1 | −3.842 | −3.769 | −3.501 | −3.980 | −4.079 | −3.988 |
| f2 | 9.624 | 10.235 | 7.556 | 11.433 | 10.149 | 14.088 |
| f3 | 4.280 | 3.980 | 4.402 | −14.706 | −14.965 | −43.478 |
| f4 | 3.056 | 3.481 | 3.345 | 1.926 | 1.942 | 1.990 |
| f5 | −5.239 | −5.125 | −5.499 | −4.860 | −5.073 | −5.160 |
| f6 | −4.675 | −5.444 | −4.842 | −15.490 | −15.140 | −10.360 |
| f7 | 1.490 | 1.486 | 1.490 | 1.649 | 1.687 | 1.644 |
| f8 | −2.180 | −2.200 | −2.238 | −2.421 | −2.376 | −2.394 |
| FNO | 1.800 | 1.800 | 1.800 | 1.800 | 1.800 | 1.800 |
| TTL | 6.149 | 6.150 | 6.149 | 6.400 | 6.400 | 6.398 |
| FOV | 119.99° | 120.00° | 120.00° | 120.00° | 120.00° | 119.99° |
| IH | 6.00 | 6.00 | 6.00 | 6.00 | 6.00 | 6.00 |

The above are only the embodiments of the present disclosure. It should be pointed out here that for those of ordinary skill in the art, improvements can be made without departing from the inventive concept of the present disclosure, but these all belong to the protection scope of the present disclosure.

What is claimed is:

1. An camera optical lens, comprising from an object side to an image side:
   a first lens having negative refractive power;
   a second lens having positive refractive power;
   a third lens;
   a fourth lens;
   a fifth lens having negative refractive power;
   a sixth lens having negative refractive power;
   a seventh lens; and
   an eighth lens,
   wherein an object side surface of the second lens is a convex surface at a paraxial position, and image side surface of the second lens is a concave surface at the paraxial position, an object side surface of the eighth lens is a convex surface at a paraxial position, an image side surface of the eighth lens is a concave surface at the paraxial position, and at least one of the first lens, the second lens, the third lens, the fourth lens, the fifth lens, the sixth lens, the seventh lens, and the eighth lens comprises a free-form surface, wherein the camera optical lens further satisfies:

$2.10 \leq f2/f \leq 11.74;$ $-14.09 \leq (R3+R4)/(R3-R4) \leq -2.21;$ and $0.02 \leq d3/TTL \leq 0.10,$ where
   f denotes a total focal length of the camera optical lens,
   f2 denotes a focal length of the second lens,
   R3 denotes a central curvature radius of an object side surface of the second lens,
   R4 denotes a central curvature radius of an image side surface of the second lens,
   d3 denotes an on-axis thickness of the second lens, and
   TTL denotes a total optical length from an object side surface of the first lens to an image plane of the camera optical lens along an optic axis.

2. The camera optical lens as described in claim 1, wherein the camera optical lens satisfies: $0.30 \leq d8/d9 \leq 1.00,$
   where
   d8 denotes an on-axis distance from an image side surface of the fourth lens to an object side surface of the fifth lens, and
   d9 denotes an on-axis thickness of the fifth lens.

3. The camera optical lens as described in claim 1, wherein the camera optical lens satisfies:

$-4.53 \leq f1/f \leq -1.30;$ $-2.30 \leq (R1+R2)/(R1-R2) \leq -0.31;$ and $0.04 \leq d1/TTL \leq 0.14,$ where
   f1 denotes a focal length of the first lens,
   R1 denotes a central curvature radius of an object side surface of the first lens,
   R2 denotes a central curvature radius of an image side surface of the first lens,
   d1 denotes an on-axis thickness of the first lens.

4. The camera optical lens as described in claim 1, wherein the camera optical lens satisfies:

$-48.31 \leq f3/f \leq 3.67;$ $-1.70 \leq (R5+R6)/(R5-R6) \leq 16.12;$ and $0.02 \leq d5/TTL \leq 0.12,$ where
   f3 denotes a focal length of the third lens,
   R5 denotes a central curvature radius of an object side surface of the third lens, R6 denotes a central curvature radius of an image side surface of the third lens, d5 denotes an on-axis thickness of the third lens.

5. The camera optical lens as described in claim 1, wherein the camera optical lens satisfies:

$0.54 \leq f4/f \leq 2.90$;

$-0.21 \leq (R7+R8)/(R7-R8) \leq 1.55$; and $0.04 \leq d7/TTL \leq 0.19$, where f4 denotes a focal length of the fourth lens, R7 denotes a central curvature radius of an object side surface of the fourth lens, R8 denotes a central curvature radius of an image side surface of the fourth lens, d7 denotes an on-axis thickness of the fourth lens.

6. The camera optical lens as described in claim 1, wherein the camera optical lens satisfies:

$-6.11 \leq f5/f \leq -1.80$;

$-0.23 \leq (R9+R10)/(R9-R10) \leq 0.71$; and $0.02 \leq d9/TTL \leq 0.06$, where f5 denotes a focal length of the fifth lens, R9 denotes a central curvature radius of an object side surface of the fifth lens, R10 denotes a central curvature radius of an image side surface of the fifth lens, d9 denotes an on-axis thickness of the fifth lens.

7. The camera optical lens as described in claim 1, wherein the camera optical lens satisfies:

$-17.21 \leq f6/f \leq -1.73$;

$-1.69 \leq (R11+R12)/(R11-R12) \leq -0.14$; and $0.04 \leq d11/TTL \leq 0.14$, where f6 denotes a focal length of the sixth lens, R11 denotes a central curvature radius of an object side surface of the sixth lens, R12 denotes a central curvature radius of an image side surface of the sixth lens, d11 denotes an on-axis thickness of the sixth lens.

8. The camera optical lens as described in claim 1, wherein the camera optical lens satisfies:

$0.41 \leq f7/f \leq 1.41$;

$0.26 \leq (R13+R14)/(R13-R14) \leq 1.12$; and $0.04 \leq d13/TTL \leq 0.13$, where f7 denotes a focal length of the seventh lens, R13 denotes a central curvature radius of an object side surface of the seventh lens, R14 denotes a central curvature radius of an image side surface of the seventh lens, d13 denotes an on-axis thickness of the seventh lens.

9. The camera optical lens as described in claim 1, wherein the camera optical lens satisfies:

$-2.69 \leq f8/f \leq -0.81$;

$1.16 \leq (R15+R16)/(R15-R16) \leq 4.06$; and $0.03 \leq d15/TTL \leq 0.11$, where f8 denotes a focal length of the eighth lens, R15 denotes a central curvature radius of an object side surface of the eighth lens, R16 denotes a central curvature radius of an image side surface of the eighth lens, d15 denotes an on-axis thickness of the eighth lens.

* * * * *